(12) United States Patent
Horemuz et al.

(10) Patent No.: US 12,218,803 B2
(45) Date of Patent: Feb. 4, 2025

(54) METHOD FOR CELL ISSUE FORECASTING

(71) Applicant: Telefonaktiebolaget LM Ericsson (publ), Stockholm (SE)

(72) Inventors: Michal Horemuz, Stockholm (SE); Philipp Frank, Madrid (ES); Raul Martin Cuerdo, Madrid (ES); Chin Lam Eng, Tokyo (JP); Javier Rasines, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 322 days.

(21) Appl. No.: 17/795,975

(22) PCT Filed: Feb. 24, 2021

(86) PCT No.: PCT/EP2021/054501
§ 371 (c)(1),
(2) Date: Jul. 28, 2022

(87) PCT Pub. No.: WO2021/170613
PCT Pub. Date: Sep. 2, 2021

(65) Prior Publication Data
US 2023/0062037 A1 Mar. 2, 2023

Related U.S. Application Data

(60) Provisional application No. 62/980,477, filed on Feb. 24, 2020.

(51) Int. Cl.
*H04L 41/147* (2022.01)
*H04W 24/02* (2009.01)

(52) U.S. Cl.
CPC ........... *H04L 41/147* (2013.01); *H04W 24/02* (2013.01)

(58) Field of Classification Search
None
See application file for complete search history.

(56) References Cited

U.S. PATENT DOCUMENTS

| 9,538,401 | B1 * | 1/2017 | Ouyang | ............... H04W 16/22 |
| 2017/0290024 | A1 * | 10/2017 | Ouyang | ............. H04L 41/0896 |
| 2020/0036605 | A1 | 1/2020 | Xie et al. | |

FOREIGN PATENT DOCUMENTS

| WO | 2018101878 A1 | 6/2018 |
| WO | WO2018157951 | * 9/2018 |

(Continued)

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.

(Continued)

*Primary Examiner* — Mohammad S Adhami
(74) *Attorney, Agent, or Firm* — Murphy, Bilak & Homiller, PLLC

(57) ABSTRACT

The invention refers to method, performed by a network optimization function associated with a wireless network (100), of forecasting performance issues associated with cells (106, 111, 116) in the wireless network, the method comprising: for each of a plurality of cells in the wireless network, obtaining (1210) first time-series data representing a plurality of key performance indicators, KPIs, at a first plurality of past time points; applying (1220) a multi-layer forecasting model to the first time-series data to determine second time-series data representing the plurality of KPIs for each of the plurality of cells at a second plurality of future time points; and based on the second time-series data, determining (1240) respective probabilities of occurrence for a respective plurality of different performance issues, (Continued)

associated with the plurality of cells, during one or more future time periods that include the second plurality of future time points; the method further refers to a corresponding network optimization function, a network optimization node and corresponding software.

20 Claims, 16 Drawing Sheets

(56) References Cited

FOREIGN PATENT DOCUMENTS

| WO | 2019233635 A1 | 12/2019 |
|----|---------------|---------|
| WO | 2020033552 A1 | 2/2020 |

OTHER PUBLICATIONS

"Keras: the Python deep learning API", https://keras.io/, Jul. 26, 2022, pp. 1-5.
"TensorFlow: An end-to-end open source machine learning platform", https://www.tensorflow.org/, Jul. 26, 2022, pp. 1-11.
Smyl, Slawek, "M4 Forecasting Competition: Introducing a New Hybrid ES-RNN Model", https://eng.uber.com/m4-forecasting-competition/ 1/, Jun. 25, 2018, pp. 1-8.
Szilagyi, et al., "An Automatic Detection and Diagnosis Framework for Mobile Communication Systems", IEEE Transactions on Network and Service Management, vol. 9, Issue 2, Jun. 2012, pp. 184-197.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.
Van Den Oord, Aaron, et al., "WaveNet: A Generative Model for Raw Audio", https://arxiv.org/abs/1609.03499v2, Sep. 19, 2016, pp. 1-15.

* cited by examiner

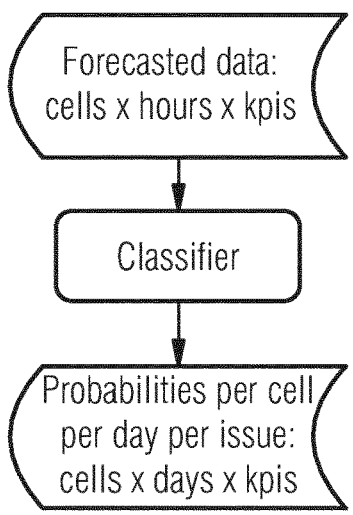

FIG. 11

For each of a plurality of cells in a wireless network, obtaining first time-series data representing a plurality of KPIs at a first plurality of past time points. — 1210

Applying a multi-layer forecasting model to the first time-series data to determine second time-series data representing the plurality of KPIs for each of the plurality of cells at a second plurality of future time points.
| For each KPI, applying a first layer to predict a linear pattern in the first time-series data. | 1221
| For each KPI, extending the linear pattern to the second plurality of time points. | 1222
| For each KPI, applying a second layer to predict a periodic pattern in the first time-series data. | 1223
| For each KPI, extending the periodic pattern to the second plurality of time points. | 1224
| Applying a third layer to predict further patterns in the plurality of KPIs based on the first time-series data and the predicted linear and periodic patterns. | 1225
| For each KPI, combining the predicted further pattern with the corresponding extended linear pattern and the corresponding extended periodic pattern to determine the KPI at the second plurality of future time points. | 1226
— 1220

Selecting respective confidence interval percentiles for the respective performance issues. — 1230

Based on the second time-series data, determining respective probabilities of occurrence for a respective plurality of different performance issues, associated with the plurality of cells, during one or more future time periods that include the second plurality of future time points. — 1240

FIG. 12

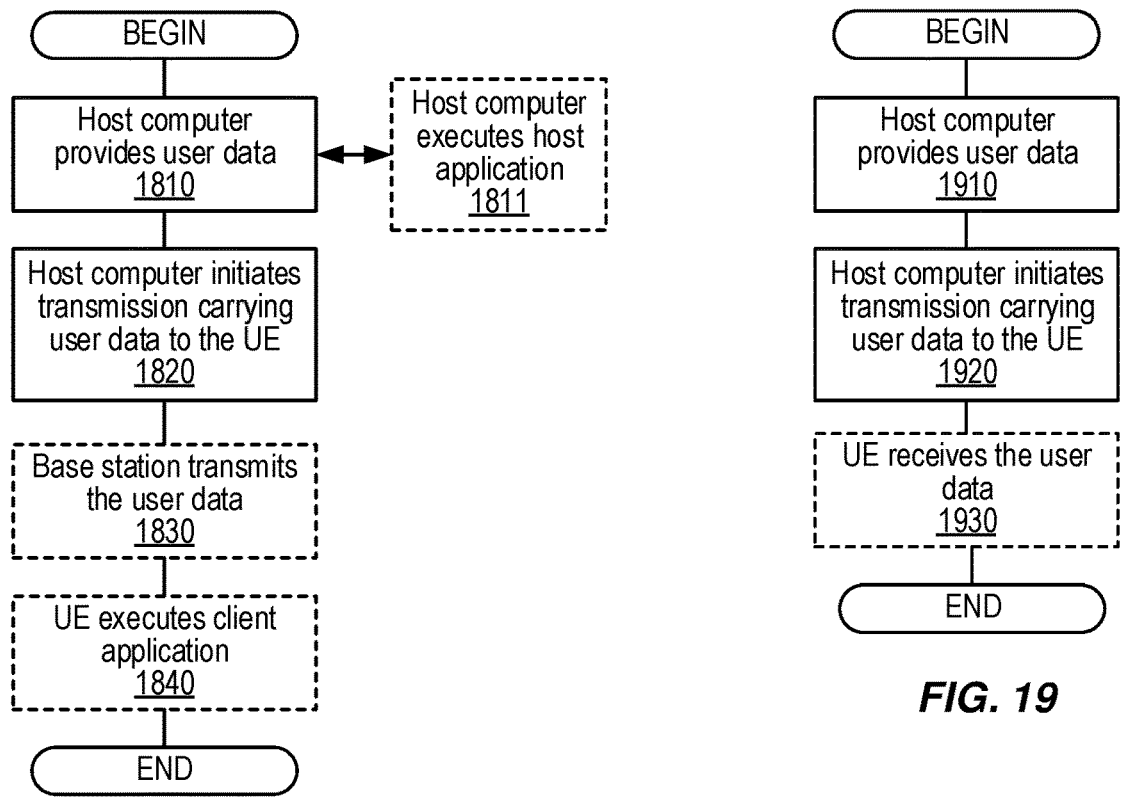
FIG. 18
FIG. 19
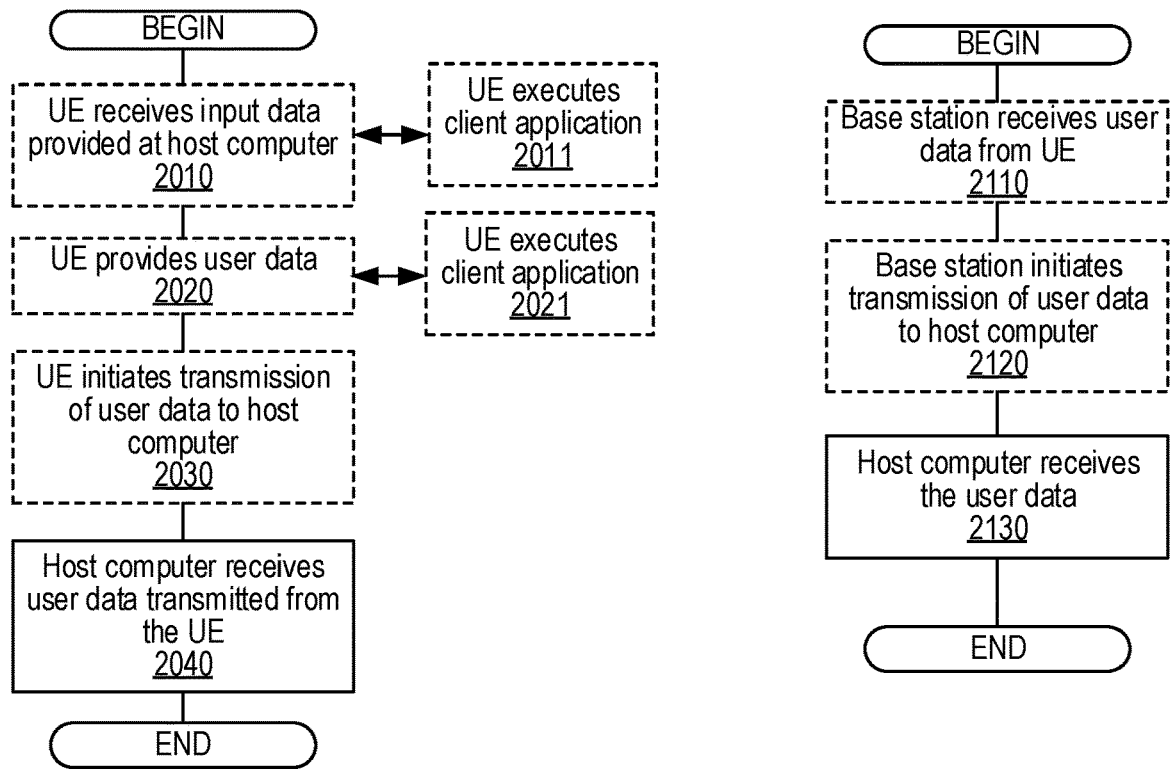
FIG. 20
FIG. 21

METHOD FOR CELL ISSUE FORECASTING

TECHNICAL FIELD

The present application relates generally to the field of cellular wireless communication networks and more specifically to improved techniques for forecasting future performance issues and/or conditions associated with cells in a wireless network.

BACKGROUND

Today's society is becoming increasingly reliant on wireless devices (e.g., smartphones) and the applications that run on such devices. In many cases, these device-based applications can receive an enormous amount of data from (and/or send data to) corresponding application servers via a communication network such as the Internet. The wireless devices receive and/or send such data via a wireless network, such as a wireless local area network (WLAN) or a wireless wide area network (WWAN).

Most WWANs are based on cellular radio access technologies (RATs), such as those defined in specifications published by the $3^{rd}$ Generation Partnership Project (3GPP). In cellular RATs, radio base stations transmit and receive signals in substantially non-overlapping coverage areas known as cells. The resources available in each cell can be partitioned in various ways to optimize various criteria such as geographic coverage, capacity (e.g., number of users, data rate, etc.), and interference with neighboring cells provided by the same base station and/or by different base stations. In general, these criteria can be expressed as a collection of key performance indicators (KPIs) associated with each cell in a wireless network (also referred to as a "radio access network" or RAN for short).

Cell KPIs can be monitored to detect conditions that negatively impact network performance and, ultimately, the quality of service experienced by end users of wireless devices that are accessing the network via the cells. Furthermore, it is desirable to not only detect such conditions as they occur, but also to forecast the occurrence of such conditions in advance. Various approaches have been used for forecasting cell performance issues, but all suffer from various problems and/or drawbacks such as inadequate forecasting horizon and inability to identify and account for any relationships between multiple KPIs of a single cell or across multiple cells.

SUMMARY

The present disclosure provides specific improvements to forecasting cell performance issues in a wireless network, such as by facilitating solutions to overcome the exemplary problems summarized above and described in more detail below Embodiments include methods (e.g., procedures) for forecasting performance issues associated with cells in a wireless network, according to various exemplary embodiments of the present disclosure. These methods may be performed by a network optimization function associated with the wireless network.

These methods can include, for each of a plurality of cells in the wireless network, obtaining first time-series data representing a plurality of key performance indicators (KPIs) at a first plurality of past time points. Various KPIs can be incorporated in the first time-series data, as described in more detail herein.

These methods can also include applying a multi-layer forecasting model to the first time-series data to determine second time-series data representing the plurality of KPIs for each of the plurality of cells at a second plurality of future time points.

In some embodiments, applying the multi-layer forecasting model can include, for each particular KPI, applying a first layer to predict a linear pattern in the first time-series data, applying a second layer to predict a periodic pattern in the first time-series data, and applying a third layer to predict further patterns in the plurality of based on the first time-series data, the predicted linear patterns, and the predicted periodic patterns. For example, the first and second layers can operate on individual KPIs while the third layer can operate across multiple KPIs.

In some embodiments, applying the first layer can include, for each particular KPI, applying a double exponential smoothing operation to the first time-series data to determine a level and a trend corresponding to a linear pattern in the first time-series data for the particular KPI. In some embodiments, applying the multi-layer forecasting model can also include, for each particular KPI, extending a linear pattern determined in the first time-series data to the second plurality of future time points.

In some embodiments, applying the second layer can include performing the following operations for each particular KPI: applying one or more discrete Fourier transforms (DFTs) to the first time-series data to generate first frequency-space data; applying respective threshold operations to the first frequency-space data to generate second frequency-space data; and applying one or more inverse DFTs to the second frequency-space data to generate the predicted periodic pattern in the first time-series data for the particular KPI. For example, the DFT/IDFT can be implemented as FFT/IFFT, or any other suitable computationally efficient DFT method. In some embodiments, applying the multi-layer forecasting model can also include, for each particular KPI, extending a periodic pattern determined in the first time-series data to the second plurality of future time points.

In some embodiments, applying the third layer can include performing the following operations: for each particular KPI, determining a difference between the first time-series data and a sum of the linear pattern predicted by the first layer and the periodic pattern predicted by the second layer, and processing the determined differences with a plurality of stacked causal convolutional layers having exponentially increasing dilation to predict the further pattern for the respective KPIs at the second plurality of future time points. In various embodiments, the further patterns for the respective KPIs can include one or more of the following: non-linear patterns for one or more of the KPIs, and patterns for one or more of the KPIs that involve relationships among multiple KPIs.

In some embodiments, applying the multi-layer forecasting model can also include, for each particular KPI, combining the predicted further pattern with the corresponding extended linear pattern and the corresponding extended periodic pattern to determine the particular KPI at the second plurality of future time points.

These methods can also include, based on the second time-series data, determining respective probabilities of occurrence for a respective plurality of different performance issues, associated with the plurality of cells, during one or more future time periods that include the second plurality of future time points.

In some embodiments, the first plurality of past time points (e.g., in the first time-series) and the second plurality of future time points (e.g., in the second time series) can be spaced at hourly intervals (e.g., equally spaced, every hour). In such embodiments, each probability of occurrence can be determined for daily future periods.

In some embodiments, these exemplary methods can also include selecting respective confidence interval percentiles for the respective performance issues. In such embodiments, for each particular performance issue, the determined probabilities of occurrence can correspond to the confidence interval percentile for the particular performance issue.

In various embodiments, the plurality of performance issues associated with the cells can include at least two of the following:
- normal or no issue,
- cell load,
- signaling load,
- coverage,
- overshooting,
- downlink (DL) utilization,
- uplink (UL) utilization,
- PUCCH interference,
- PUSCH interference,
- PUSCH-PUCCH interference,
- PUCCH performance,
- RACH access, and
- processor load.

Exemplary embodiments also include network optimization functions associated with a wireless network and network optimization nodes in the wireless network that are configured to perform operations (e.g., using processing circuitry) corresponding to any of the exemplary methods described herein.

Exemplary embodiments also include non-transitory, computer-readable media storing computer-executable instructions that, when executed by processing circuitry associated with network optimization functions of a wireless network, configure the same to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 10, which includes

FIG. 11 shows a signal flow diagram that illustrates dataflow into and out of a cell issue classifier, according to various exemplary embodiments of the present disclosure FIG. 12 illustrates an exemplary method (e.g., procedure) performed by an network optimization in a wireless network, according to various exemplary embodiments of the present disclosure.

FIGS. 18-21 are flow diagrams illustrating various exemplary methods implemented in a communication system, according to various exemplary embodiments of the present disclosure.

DETAILED DESCRIPTION

Figure 1:
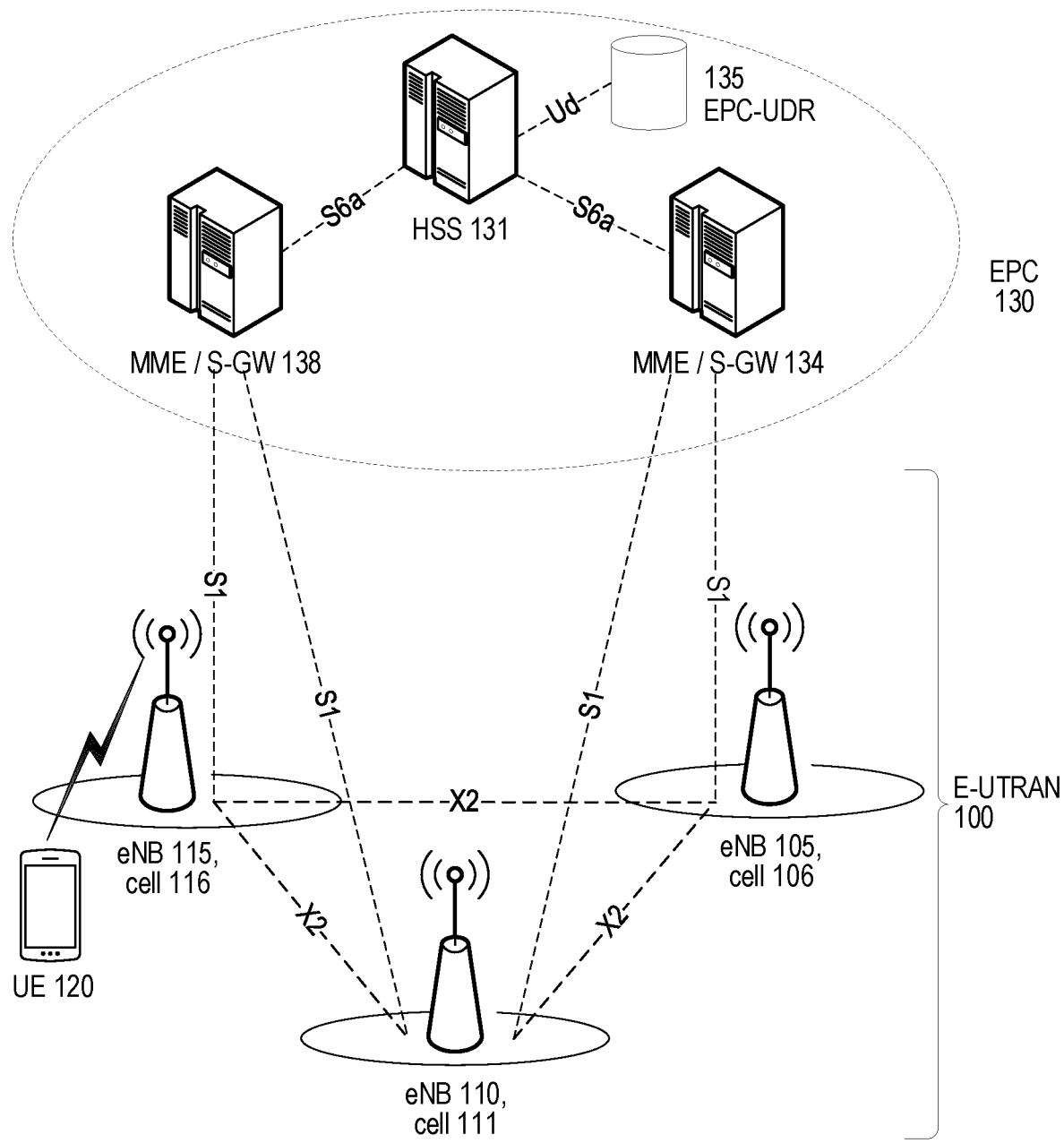
FIG. 1 is a high-level block diagram of an exemplary architecture of the Long-Term Evolution (LTE) Evolved UTRAN (E-UTRAN) and Evolved Packet Core (EPC) network, as standardized by 3GPP.

Some of the examples contemplated herein will now be described more fully with reference to the accompanying drawings. Other examples, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:
  Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, various approaches have been used for forecasting cell performance issues in cellular wireless networks, but all suffer from various problems and/or drawbacks such as inadequate forecasting horizon and inability to identify and account for any relationships between multiple KPIs of a single cell or across multiple cells. These issues are discussed in more detail below after the following description of various 3GPP cellular RATs.

Long Term Evolution (LTE) is an umbrella term for so-called fourth-generation (4G) radio access technologies developed within 3GPP and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases, 3GPP LTE Rel-10 supports bandwidths larger than 20 MHz. One important Rel-10 requirement is backward compatibility with Rel-8, including spectrum compatibility. As such, a wideband LTE Rel-10 carrier (e.g., wider than 20 MHz) appears as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

Figure 2A:
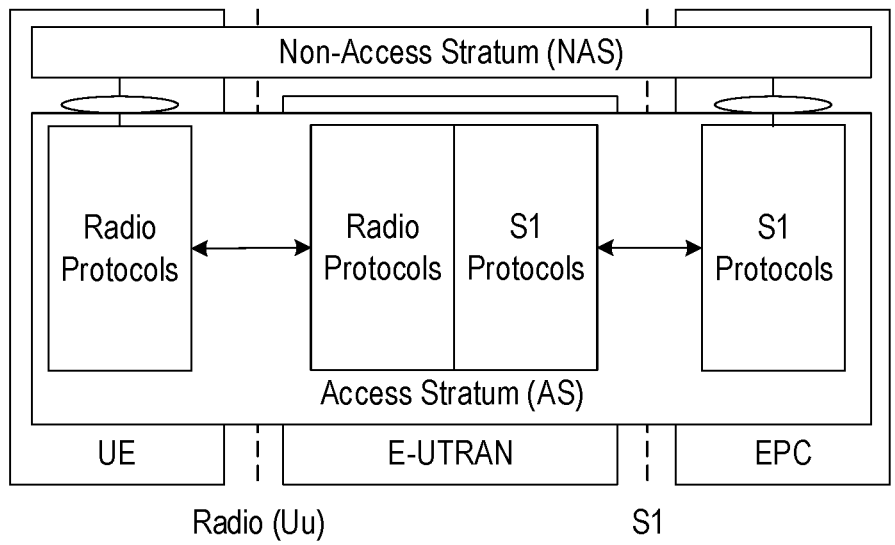
FIG. 2A is a high-level block diagram of an exemplary E-UTRAN architecture in terms of its constituent components, protocols, and interfaces.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

Figure 2B:
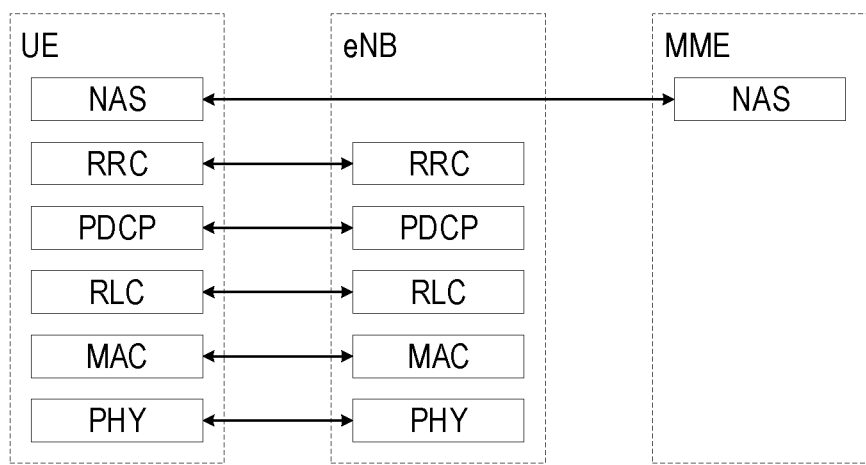
FIG. 2B is a block diagram of exemplary protocol layers of the control-plane portion of the radio (Uu) interface between a user equipment (UE) and the E-UTRAN.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB is via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is then used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as discussed above, but comprising $N^{DL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as the numerology, p.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS as well as sounding reference signals (SRS). Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

Currently the fifth generation ("5G") of cellular systems, also referred to as New Radio (NR), is being standardized within 3GPP. NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

5G NR technology shares many similarities with 4G LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Another difference is that the configuration of time-frequency resources within a cell is much more flexible for NR than for LTE. For example, rather than a fixed 15-kHz SCS as in LTE, NR SCS can range from 15 to 240 kHz, with even greater SCS being considered for future NR releases.

Figure 3:
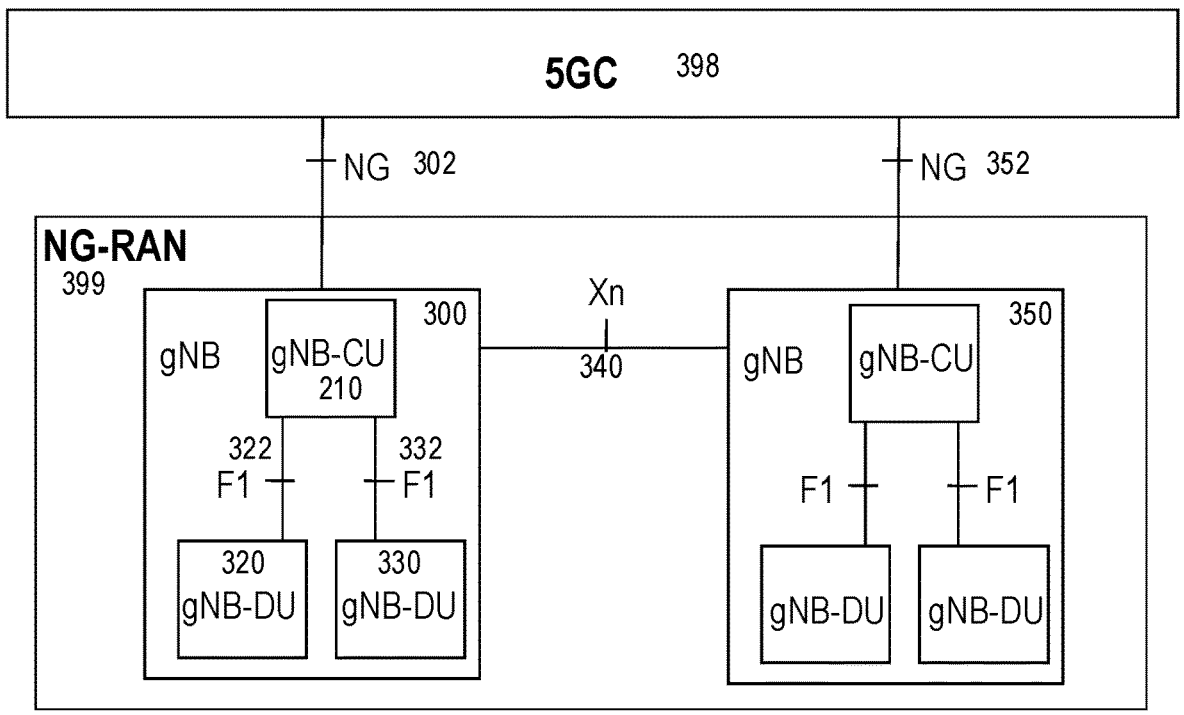
FIGS. 3-4 illustrate two different high-level views of a 5G network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501.

If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
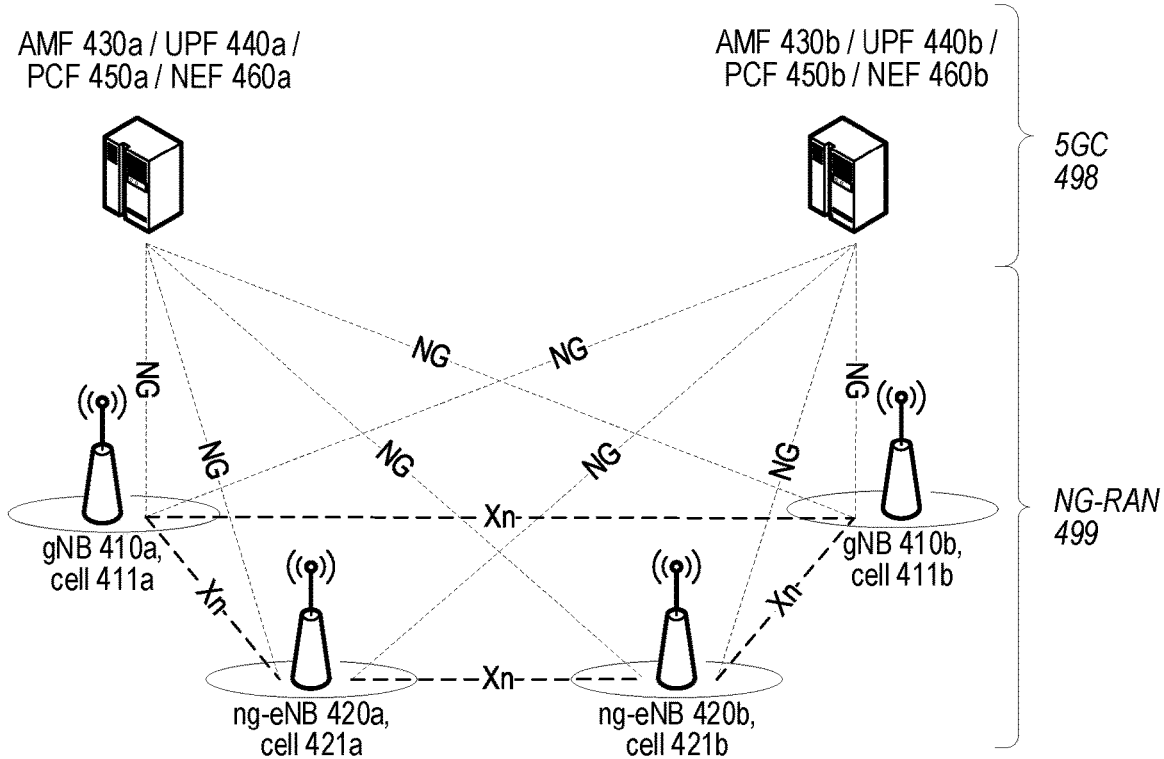

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a,b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This SBA model, which further adopts principles like modularity, reusability and self-containment of NFs, can enable deployments to take advantage of the latest virtualization, cloud, and other software technologies.

In general, the various services are self-contained functionalities that can be changed and modified in an isolated manner without affecting other services. More specifically, the services can be composed of various "service operations", which are more granular divisions of overall service functionality. In order to access a service, both the service name and the targeted service operation must be indicated. The service access can be based on Hyper Text Transfer Protocol/Representational State Transfer (HTTP/REST) application programming interfaces (APIs). As such, the interactions between service consumers and producers can be of the type "request/response" or "subscribe/notify". Furthermore, network repository functions (NRF) allow every network function to discover the services offered by other network functions, and Data Storage Functions (DSF) allow every network function to store its context.

In a radio access network (RAN), the time, frequency, and spatial resources available in each cell (e.g., cells 106, 111, 116 shown in FIG. 1, cells 411 and 421 shown in FIG. 4) can be partitioned in various ways to optimize various criteria such as geographic coverage, capacity (e.g., number of users, data rate, etc.), and interference with neighboring cells provided by the same base station or different base stations. In general, these criteria can be expressed as a collection of key performance indicators (KPIs) associated with each cell in the RAN (e.g., E-UTRAN 100 shown in FIG. 1, NG-RAN 399, 499 shown in FIGS. 3-4).

Cell KPIs can be monitored to detect issues, conditions, and/or problems (referred to generically as "issues") that negatively impact network performance and, ultimately, the quality of service experienced by end users of wireless devices that are accessing the network via the cells. Furthermore, it is desirable to not only detect such issues as they occur, but also to forecast the occurrence of such issues in advance.

Current approaches to cell issue forecasting typically utilize classical time series forecasting methods and some form of rule-based classifier which uses thresholding on the predicted KPI values. One example is the paper by Szilagyi, et al., "An Automatic Detection and Diagnosis Framework for Mobile Communication Systems", IEEE Transactions on Network and Service Management, vol. 9, issue 2, pp. 184-197. The rules and thresholds used in such techniques are typically based on human observations and small sampled data sets. Furthermore, the number of performance metrics used to identify cell load issues is typically small and consists only of common metrics.

A commonly used time series forecasting methods is Holt-Winters. This method uses triple exponential smoothing to estimate level, trend, and seasonality of a time series. More specifically, three exponential functions are used to assign exponentially decreasing weights to data over time. This approach is different from moving average forecasting (e.g., auto-regressive moving average, ARIMA), in which past observations are weighted equally.

Classical time series forecasting methods such as Holt-Winters and ARIMA are considered to be among the most accurate. However, deep learning methods based on long short-term memory networks (LSTMs) offer some advantages in time series forecasting, such as the automatic learning of temporal dependence and the automatic handling of temporal structures like trends and seasonality. Even so, such deep learning methods perform worse on some time-series datasets.

There have been recent advances in time series modelling using deep learning with a new architecture called Wavenet, described in the paper "Wavenet: A New Generative Model for Raw Audio" by van den Oord, et al. Wavenet has the advantage of being able to examine large timespans with relatively few parameters but has been used primarily for audio signals. There have also been some advances in combining the classical forecasting methods with modern deep learning-based methods. The winner of Uber's M4 Forecasting Competition combines exponential smoothing and recurrent neural networks to create a hybrid exponential smoothing recurrent neural network (ES-RNN). In general, an RNN uses connections between nodes form a directed graph along a temporal sequence, which allows it to exhibit temporal dynamic behavior.

However, all of these techniques suffer from various problems, issues, and/or difficulties when applied to forecasting cell issues in a wireless network. First, these techniques generally involve rule-based classification of issues, in which hard KPI thresholds are used as decision boundaries for classification. This approach assumes convex decision areas in feature space, which may not be a reasonable assumption. The strictness of the boundaries is not robust and does not allow for any confidence of the classification. This is a drawback because the models are not flexible and under-perform in previously unseen situations. Second, while classical time series methods have in the past shown to be superior, they have several significant disadvantages including difficulties generalizing across time series, short prediction horizon, and being limited to univariate time-series, which means only one KPI is considered when making predictions.

Exemplary embodiments of the present disclosure address these and other problems, issues, and/or difficulties by providing techniques that combine the flexibility of deep learning with the precision of classical time-series forecasting methods. For example, such embodiments can combine Holt's linear method with a discrete fourier transform (e.g., fast fourier transform, FFT) and a deep learning architecture (e.g., Wavenet). Moreover, although such embodiments are described herein as being applied to cell issue forecasting and/or performance prediction, other embodiments can be applied to any multi-variable time series prediction problem according to similar principles.

In various embodiments, Holt's linear method is used with double exponential smoothing to identify a level and a trend in a time series, while an FFT is used to identify a seasonal component in the time series. Both techniques can be implemented as Tensorflow layers such that their hyper-parameters can be exposed as trainable variables. Tensor-Flow is an end-to-end open source platform for machine learning that has a comprehensive, flexible ecosystem of tools, libraries, and community resources that lets developers easily build and deploy ML powered applications (http://tensorflow.org). Keras is a high-level neural networks application programming interface (API), written in Python language and capable of running on top of Tensorflow (http://keras.io).

Figure 5:
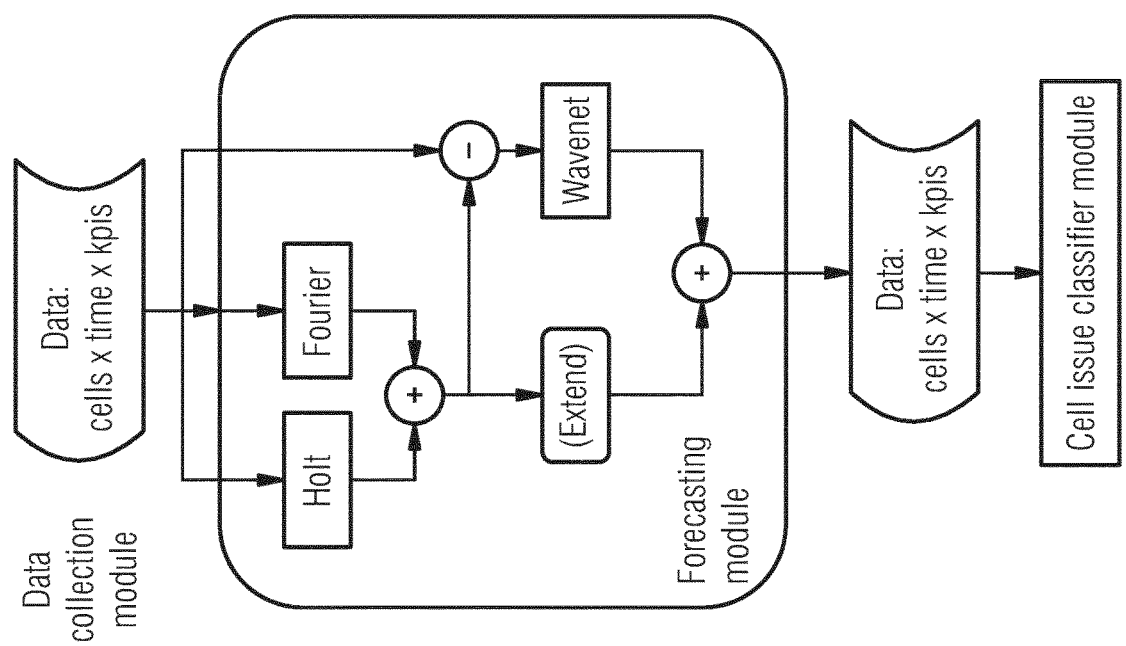
FIG. 5 shows a flow diagram illustrating an exemplary time-series forecasting architecture according to various exemplary embodiments of the present disclosure.

FIG. 5 shows a flow diagram illustrating an exemplary time-series forecasting architecture according to various exemplary embodiments of the present disclosure. The exemplary architecture shown in FIG. 5 includes a data collection module, a forecasting module, and a cell issue classifier module. The respective modules can be part of a network optimization function that is implemented by processing and/or communication resources provided by one or more nodes, e.g., in a wireless network or in a cloud-computing infrastructure associated with the wireless network.

The forecasting module first uses Holt and FFT layers to extract the level, trend, and seasonal components from the input provided by the data collection module (discussed in more detail below). These are combined and then subtracted from the original time series and input to the Wavenet layer, which predicts the future residuals. The level, trend, and seasonality determined by the Holt and FFT layers are extended into the future and added to the Wavenet predictions. As shown in FIG. 5, both the input time series data (representing past) and the output time series data (representing future predictions) are provided in the form of multiple KPIs for each cell, sampled on equally-spaced time points (e.g., every hour).

The resulting final predictions are then passed to a deep learning classifier for issue classification. In various embodiments, this can be performed by a cell issue classifier, which is a deep neural network that has been trained to identify issues based on patterns of different KPIs. This method of classifying cell issues is both more precise and more robust than a rule-based classifier. Because it looks for patterns in the cell KPIs, the cell issue classifier avoids the drawbacks of hard thresholds. It allows for arbitrary decision boundaries, generalizes well to unseen data, and the output can be interpreted as a probability, which gives a level of confidence in the classification.

The various embodiments that combine classical and deep learning forecasting methods can provide various exemplary advantages. For example, while the Holt layer and the FFT layer consider each KPI separately, the deep learning (e.g., Wavenet) does not have this restriction and can consider multiple KPIs together to predict them simultaneously. This allows the model to capture patterns that span multiple KPIs and make a more accurate prediction. As another example, because all layers (Holt, FFT, and Wavenet) can be implemented as trainable Tensorflow/Keras layers, all three methods can be connected and trained as a single model. This allows all model parameters to be tuned to the target dataset and allows the final model to learn from different time series.

Furthermore, such embodiments can learn to predict both linear and non-linear patterns in the time-series data, and can exhibit improved accuracy related to techniques that rely on single KPI forecasting. Furthermore, training of the model only needs to be done once, and inference is very fast due to the parallelization of operations in a Tensorflow/Keras implementation. As such, implementations of embodiment can produce results quickly and can be scaled easily. Furthermore, as mentioned above, underlying principles of the embodiments can be applied to problems other than cell issue forecasting.

At a high level, embodiments involve three main stages: data collection and pre-processing, forecasting, and classification. Cell KPIs are pre-processed and reshaped to be represented as time series in the form #cells×time×#KPIs, where #cells is the number of cells, time is the time dimension (hourly resolution), and #KPIs are the number of KPIs to be predicted. The KPIs for each cell may relate to load experienced by the cell, interference experienced by the cell, radio conditions experienced by UEs served by the cell, etc. Such KPIs can include a relatively large number of performance metrics, including otherwise unconventional performance metrics. In an exemplary embodiment, the 33 KPIs listed in Table 1 below can be used. All KPIs can take on values between 0 and 1.

TABLE 1

| KPI name | Description |
| --- | --- |
| 'AVG_ACTIVE_USERS_DL' | Avg. number of active DL users per Time Transmission Interval (TTI) |
| 'AVG_ACTIVE_USERS_UL' | Active number of UL users per TTI |
| 'AVG_SE_DL' | Avg. number of DL scheduling entities per TTI |
| 'AVG_SE_UL' | Avg. number of UL scheduling entities per TTI |
| 'RRC_CONN_ATT' | RRC connection attempts |

TABLE 1-continued

| KPI name | Description |
| --- | --- |
| 'AVG_RRC_CONN_USERS' | Avg. number RRC_CONNECTED users |
| 'MAX_RRC_CONN_USERS' | Max. number RRC_CONNECTED users |
| 'DATAVOL_DRB_DL' | DL data volume for Data Radio Bearer (DRB) traffic |
| 'DATAVOL_DRB_UL' | UL data volume for DRB traffic |
| 'DATAVOL_SRB_DL' | DL data volume for Signaling Radio Bearer (SRB) traffic |
| 'DATAVOL_SRB_UL' | UL data volume for SRB traffic |
| 'AVG_PRB_UTIL_DL' | Avg. DL physical resource block (PRB) utilization |
| 'AVG_PRB_UTIL_UL' | Avg. UL PRB utilization |
| 'AVG_PDCCH_CCE_LOAD' | Avg. PDCCH control channel element (CCE) load |
| 'AVG_CQI' | Avg. channel quality indicator (CQI) value |
| 'CQI_BELOW_6_RATE' | Portion of CQI values below six (6) |
| 'AVG_USER_THP_DL' | Avg. DL user throughput |
| 'AVG_USER_THP_UL' | Avg. UL user throughput |
| 'RA_CBRA_MSG2_ATT' | UE attempts on RACH |
| 'ROBUST_RA_SR' | UE random access success ratio |
| 'AVG_HARQ_DTX_DL' | Avg. DL hybrid ARQ (HARQ) discontinuous transmission (DTX) ratio |
| 'AVG_HARQ_DTX_UL' | Avg. UL HARQ DTX ratio |
| 'AVG_PUSCH_SINR' | Avg. PUSCH signal to interference plus noise ratio (SINR) |
| 'AVG_PUCCH_SINR' | Avg. PUCCH SINR |
| 'PUSCH_SINR_BELOW_NEG2 DB_RATE' | Portion of PUSCH SINR below −2 dB |
| 'PUCCH_SINR_BELOW_NEG0 DB_RATE' | Portion of PUCCH SINR below 0 dB |
| 'AVG_N_I_PUSCH' | Avg. PUSCH interference level |
| 'AVG_N_I_PUCCH' | Avg. PUCCH interference level |
| 'UL_PATHLOSS_ABOVE_130 DB_RATE' | Portion of UL pathloss above 130 dB |
| 'AVG_UL_PATHLOSS' | Avg. UL pathloss |
| 'UL_TB_POWER_LIMITED' | Portion of UE UL transmit power limited |
| 'AVG_MP_LOAD' | Avg. processor load |
| 'MP_LOAD_ABOVE_80_RATE' | Portion of processor load >80% capacity |

Figure 6:
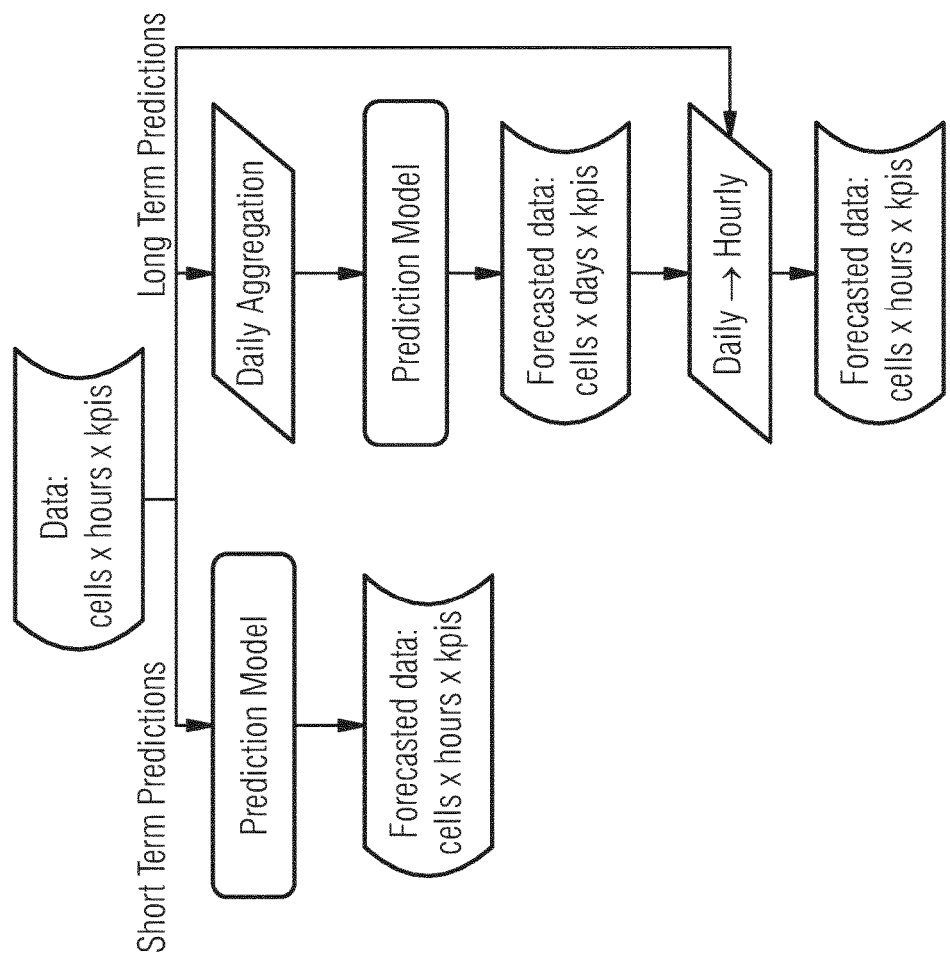
FIG. 6 shows a flow diagram for an exemplary forecasting module, according to various exemplary embodiments of the present disclosure.

The pre-processed time series are input to the forecasting module, which has two settings: long-term prediction and short-term prediction. FIG. 6 shows a flow diagram for an exemplary forecasting module, according to various exemplary embodiments of the present disclosure. The input is the pre-processed data and the output is data in the same format. The data is then passed to the cell issue classifier where probabilities for various cell issues are obtained on a daily basis over the predicted time horizon.

For the short-term model, the input data is predicted as is without modification. The actual prediction model is described below. As mentioned above, the input data has shape (#cells, hours, #KPIs) and the output data is (#cells, predicted hours, #KPIs), where predicted hours is the range of future time points (i.e., hours) that are predict from the past time points (i.e., input hours). If the model is untrained, it can be trained on the input data and then provides a prediction. Residuals can be collected during training on a hold-out set and can be used for constructing confidence intervals in the final prediction. In general, the short-term prediction can be used forecast 1-2 weeks in the future, e.g., to facilitate short-term cell issue optimization.

When predicting longer time horizons, the amount of data that needs to be processed grows and some approximations may be needed. As noted above, the input data has hourly resolution but can be aggregated into daily values by taking the average value of each day's hourly KPI values between the hours of 08:00 and 20:00. This provides a single average KPI value for each day and reduces the size of the data by a factor of 24. The prediction is then performed on these aggregated values with the same model as for the short-term predictions (explained in more detail below). The output of this prediction is in the same format as the input, i.e., daily values.

However, the cell issue classifier requires input data with hourly resolution. To remedy this, we convert our daily predictions to hourly predictions with an approximation. For each KPI, an "average day" can be calculated during the last week, and then modified to have the predicted mean KPI values for each predicted day. For example, let the prediction of a single day be $Y_P$ (1×33 KPIs) and the "average day" be $D_A$ (24 hours×33 KPIs). The mean of the average day across the hours of 08:00 and 20:00 can be calculated as:

$$Y_A(1\times 33 \ KPIs) = \text{mean}(D_A[8:20,:], \text{axis}=0)$$

We then subtract $Y_A$ from $D_A$ and add $Y_P$ to obtain $D_P$ (24 hours×33 KPIs), which is compatible with the cell issue classifier:

$$D_P = D_A[8:20,:] - Y_A + Y_P.$$

The mean of the hours between 08:00 and 20:00 match the predicted means. This is done for each cell and predicted day, and the final output shape is then (#cells, predicted hours, #KPIs), where predicted hours is 24 times the number of predicted days. If the model is untrained, it can be trained on the input data and then provides a prediction. Residuals can be collected during training on a hold-out set and can be used for constructing confidence intervals in the final prediction. The long-term model can be used to forecast 1+ month ahead, e.g., to use for long term capacity planning.

Referring again to the exemplary time-series forecasting architecture shown in FIG. 5, the model can be implemented as a single Tensorflow/Keras model, with three custom layers. The input to the model is a time series in the shape (batches×input time×features) and the output is in the shape (batches×out time×features). The input time is the number of past time points to consider when predicting the next "out time" time points. For the present example, the batches are different cells and the features are cell KPIs.

Figure 7:
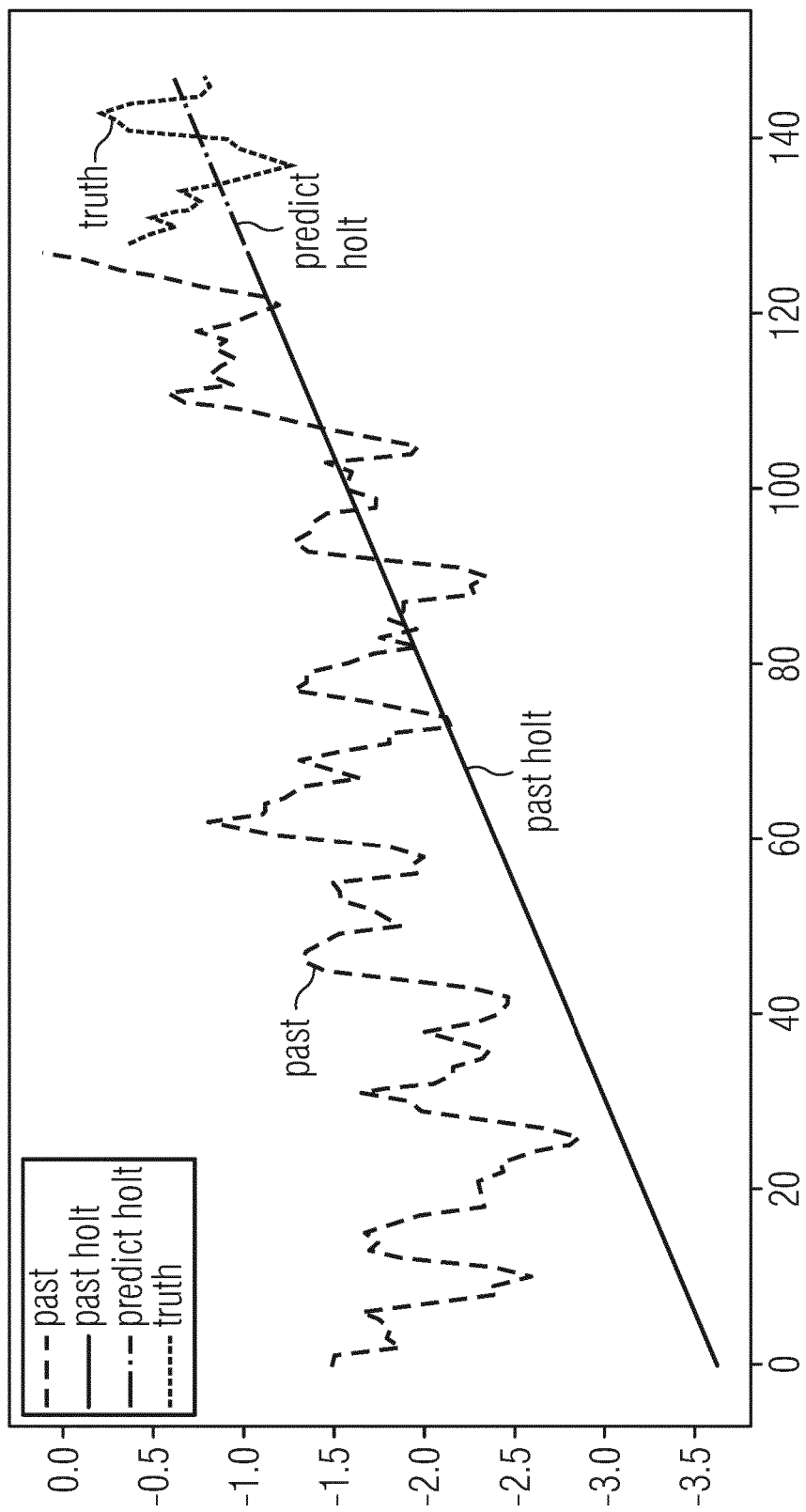
FIG. 7 shows an exemplary prediction output for a particular KPI based on a single layer (linear) model.

The first layer can use the Holt forecasting model, with the goal of predicting a linear trend of the input time series. This layer performs Holt's linear method, otherwise known as double exponential smoothing, to estimate the level and trend of the input time series. The level and trend can be interpreted as the parameters (a, b) that define line y=ax+b, where a is the trend (or slope) and b is the level (or y-intercept). The values of a and b are obtained using the following exponential smoothing operations:

$$a_t = \alpha Y_t + (1-\alpha)[a_{t-1} + b_{t-1}]$$

$$b_t = \beta(a_t - a_{t-1}) + (1-\beta)b_{t-1},$$

where $\alpha$ and $\beta$ are smoothing parameters that are optimized during training. These operations are performed per KPI. FIG. 7 shows exemplary linear prediction based on the first (Holt) layer for a particular KPI. The output of this layer is the line labelled "past holt" which can be later extended into future time points ("predict holt") as discussed below. FIG. 7 also shows the KPI input data ("past data") and some exemplary actual future data ("truth"). The numbers on the X and Y axes are arbitrary and introduced only to facilitate understanding.

The second layer shown in FIG. 5 tries to predict a periodic part of the input time series using Fourier-series techniques, and thus may be referred to as a "Fourier layer". The Fourier layer performs a discrete Fourier transform (DFT, e.g., by fast Fourier Transform, FFT) on the input data, applies a filter in the frequency space, and then performs the Inverse DFT (e.g., IFFT). For the frequency-space filter, the amplitude, $A_f$, of the complex IFFT output $F_f$ is calculated at each frequency f. For each frequency, there is a parameter $T_f$ that is learned during the training process. The following sigmoid threshold operation can then be applied at each frequency f to determine a threshold component $F_{out}$:

$$F_{out} = \frac{F_f}{1 + \exp(-(A_f + T_f))}$$

Figure 8:
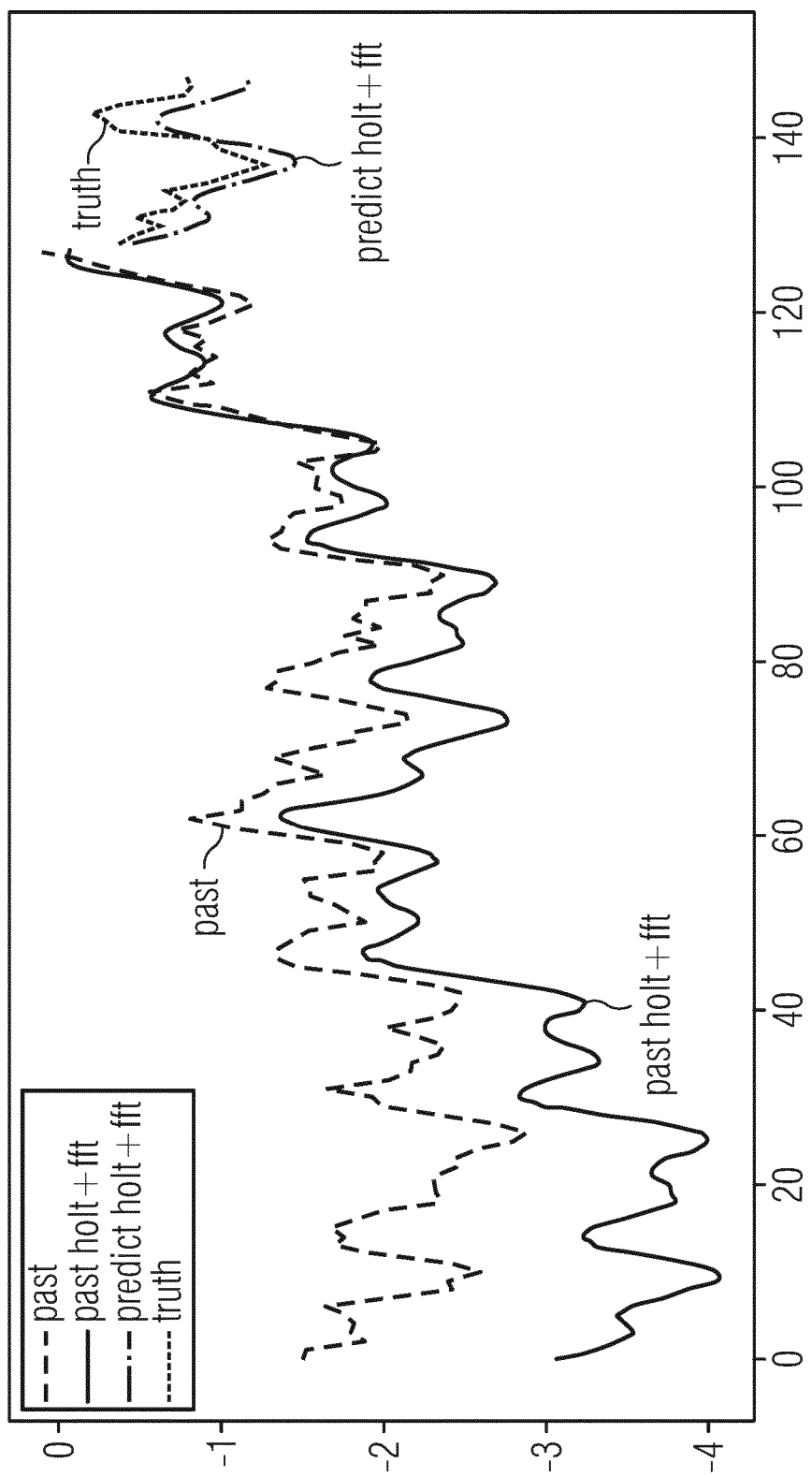
FIG. 8 shows an exemplary prediction output based on a two-layer (linear and periodic) model and the dataset shown in FIG. 7.

FIG. 8 shows an exemplary result when both the Holt and Fourier layers are used for prediction on the same dataset shown in FIG. 7. The line "past holt+FFT" indicates combined modelling of the past data and the line "predict holt+FFT" shows the combined model extended into the future time points, similar to FIG. 7. FIG. 8 also shows the actual values at the future time points ("truth").

In general, the extension operations can be considered a separate layer or parts of the respective Holt and Fourier layers. In addition, the output of the holt and Fourier layers (e.g., "past holt+FFT") can be subtracted from the original time series (e.g., "past") and the extended output of the Holt and Fourier layers (e.g., "predict holt+FFT") can be added to the output of the third layer of the model.

The third layer shown in FIG. 5 tries to make predictions based on non-linear patterns as well as multi-KPI relationships and/or patterns in the past data. This layer can utilize a Wavenet-like architecture and thus may be referred to as a "Wavenet layer". However, Wavenet is only exemplary and other architectures and/or machine learning methods that utilize similar principles can also be employed in the third layer. In general, the third layer uses stacked causal convolutional layers with exponentially increasing dilations. These techniques facilitate extraction of complicated patterns in very long time series without requiring a large number of parameters.

The input to the third layer is the difference between the original past time series and the combined predictions of the linear and seasonal features in the past time series by the first two layers (e.g., "past holt+FFT" in FIG. 8). The third layer output is predicted future values based on the difference input. The output is then added to the extended values from the first two layers, discussed above, to form the final prediction for the future time points.

Figure 9:
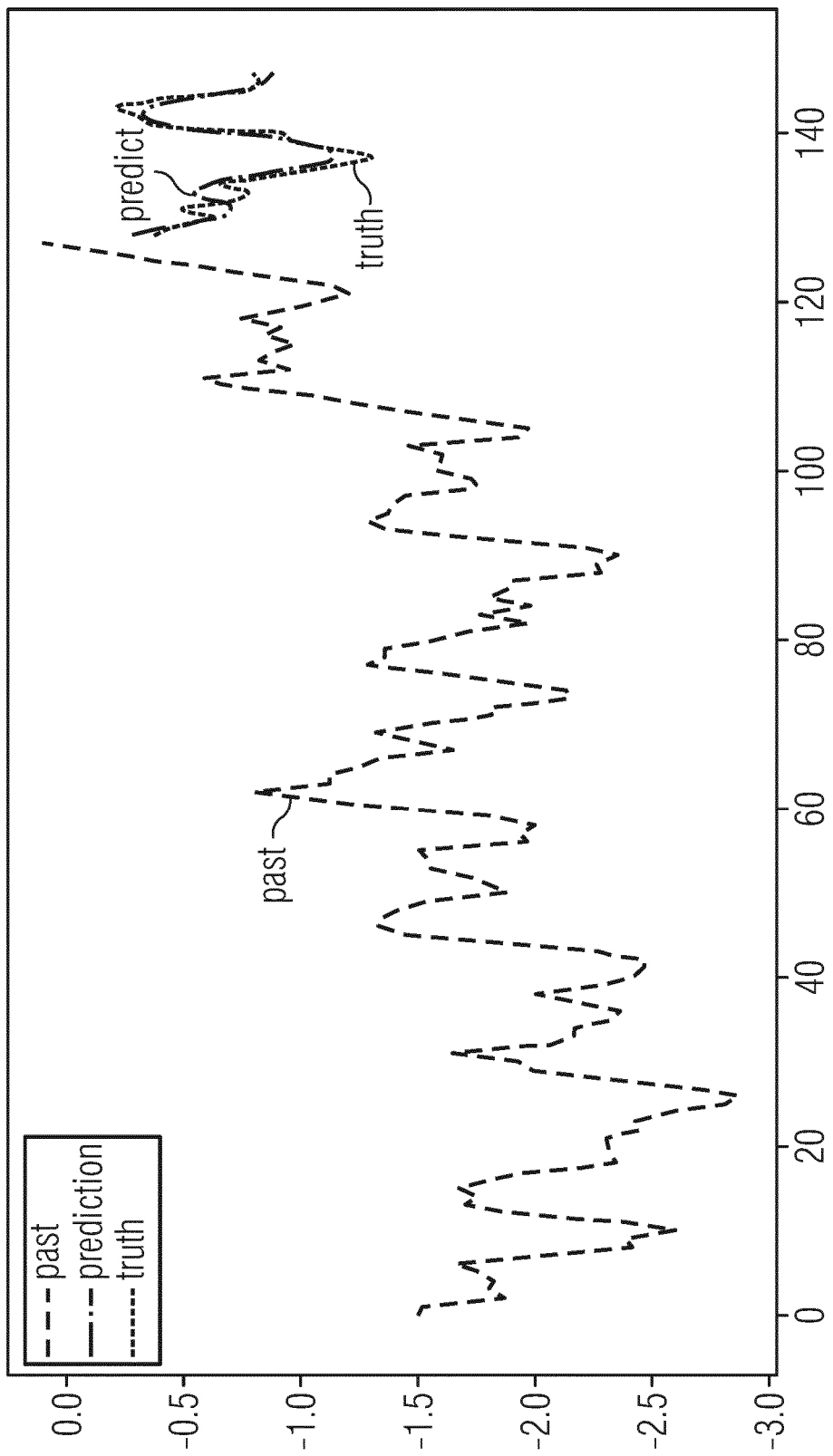
FIG. 9 shows an exemplary prediction output based on a three-layer model used on the dataset shown in FIG. 7, according to various exemplary embodiments of the present disclosure.

FIG. 9 shows an exemplary output of the multi-layer model ("predict") together with the original time series ("past") and the actual time series values at the future time point ("truth"). Compared to one- and two-layer future predictions shown FIGS. 7 and 8, the predicted future values based on the three-layer model are much closer to the actual future values. In other words, the three-layer model exhibits reduced prediction error.

Figure 10A:
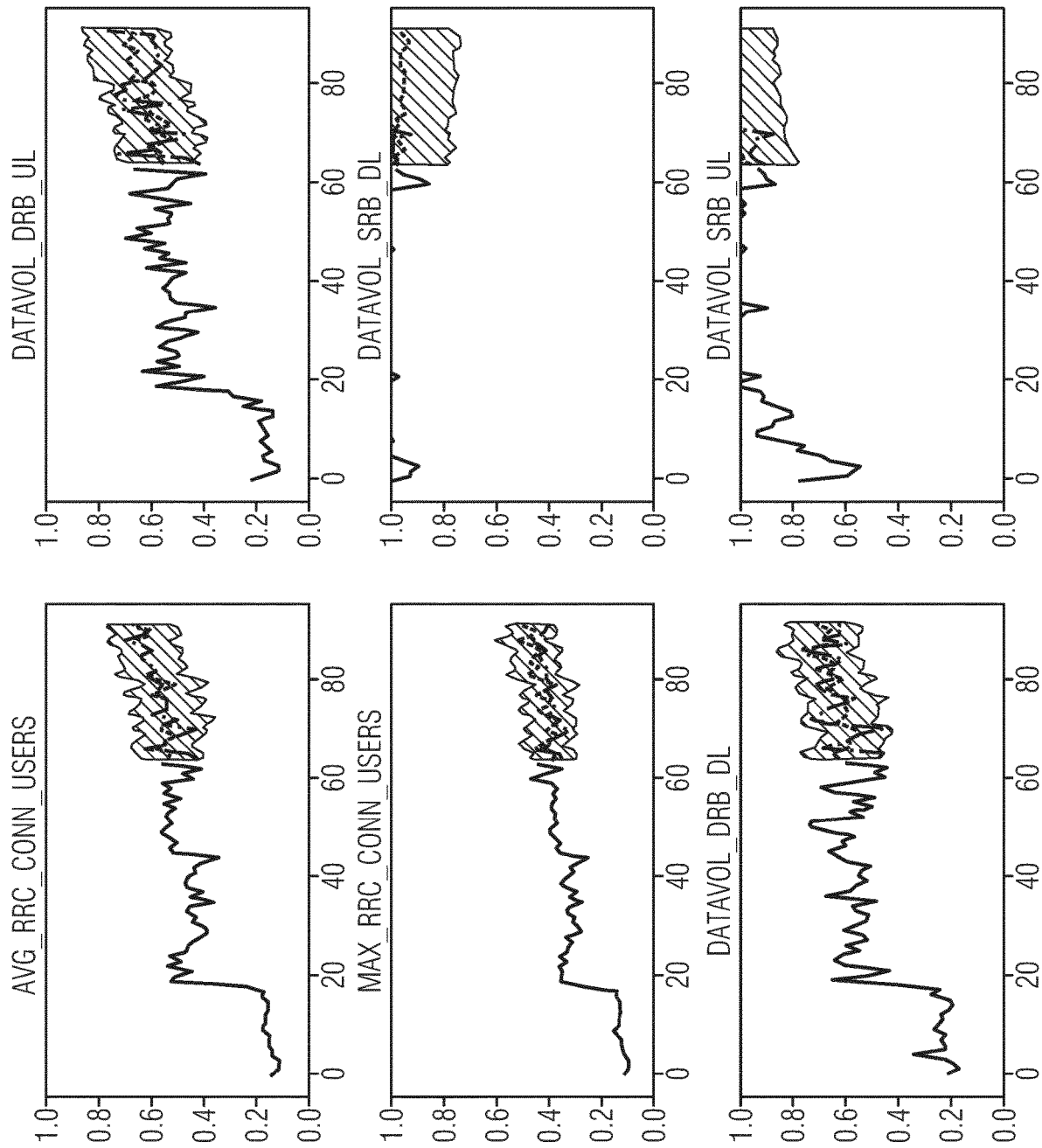
FIGS. 10A-B, shows results of a three-layer model as applied to input data for 12 different cell KPIs, according to various exemplary embodiments of the present disclosure.
Figure 10B:
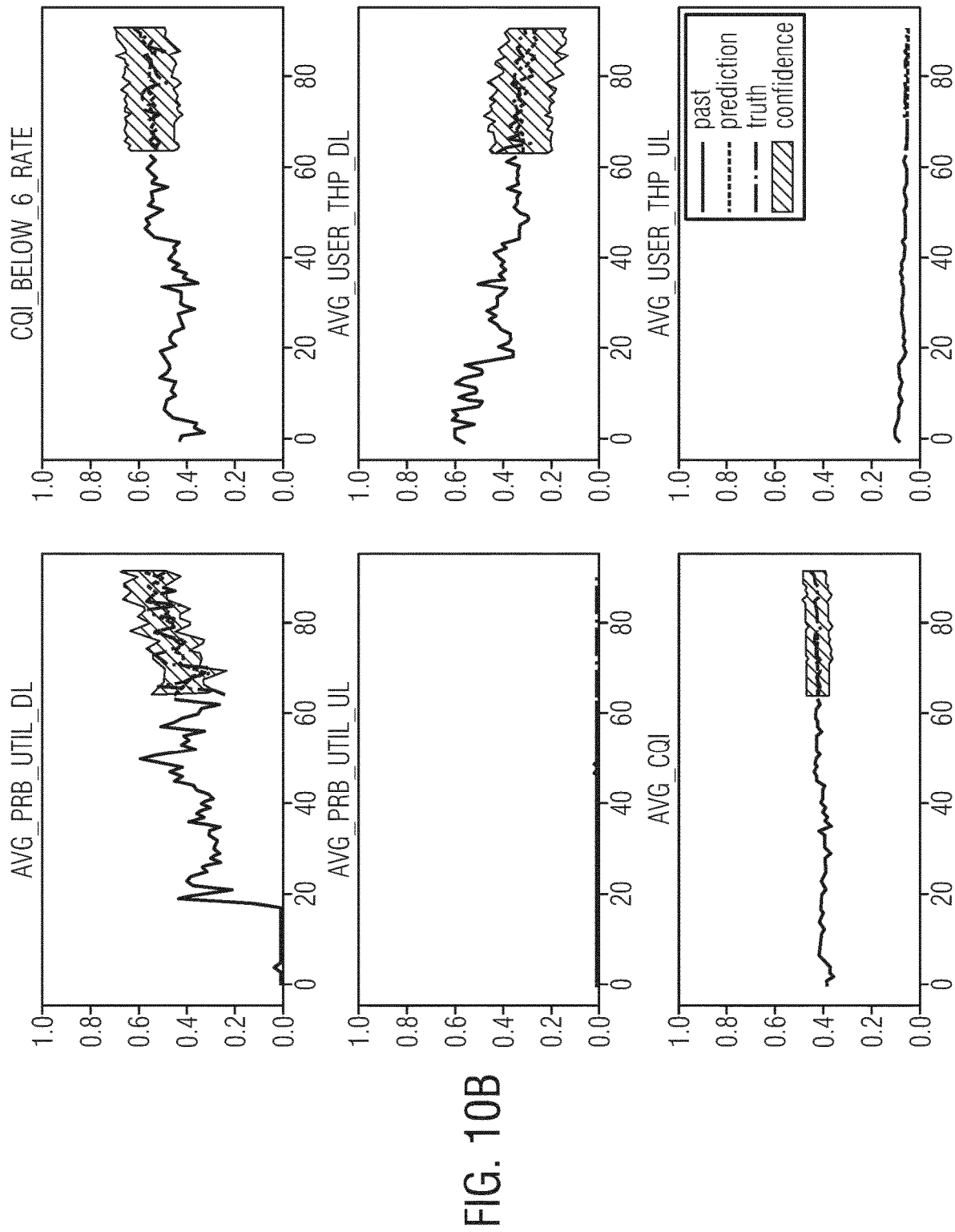

FIG. 10, which includes FIGS. 10A-B, shows the results of the three-layer model as applied to input data for 12 different cell KPIs from Table 1 above. In addition to past data, predicted future data, and actual future data, each graph also shows a confidence interval for the predicted future values.

The predicted values from the multi-layer forecasting are then sent to the cell issue classifier, which gives a probability of each issue per forecasted day. FIG. 11 shows a signal flow diagram that illustrates dataflow into and out from the cell issue classifier, according to various exemplary embodiments of the present disclosure.

In general, the cell issue classifier uses Convolutional Neural Networks (CNNs) to create a classifier model for detecting a large variety of cell conditions. This has important advantages because CNNs can significantly reduce complexity and overfitting compared to commonly used Multi-Layer Perceptron (MLP) networks. For example, in an MLP network, each value is treated as an independent input, which results in a large number of weights in the network. Having a large number of weights not only leads to increased training time but also makes the model prone to overfitting due to the large number of parameters.

Furthermore, applying CNNs allows all relevant features to be efficiently detected and enables more generic feature learning compared to MLP networks, producing a set of feature maps at each convolutional layer. These generic learned features can be used for all data. This has the advantage that cell issues can be detected independent of their time of occurrence (e.g., day or night-time, busy hour, etc.).

More specifically, the cell issue classifier uses stacked causal convolutional layers having exponentially increasing dilation to produce a probability of each cell issue per forecasted day. The forecast period can include the future time points considered by the multi-layer forecasting model. The output probability values are based on the nth percentile of a confidence interval, where n can be configurable. In general, n regulates how pessimistic the classifier is. With high n, the classifier will take values that are closer to the "worst case" values. This allows the user to identify cells that are "on the edge" of having an issue and/or whose performance is gradually deteriorating over time. Different percentile values n can be selected for the various cell issues being forecast, as needed and/or desired.

The following are some exemplary cell issues that can be identified by the cell issue classifier based on the forecast data input shown in FIG. 11:

normal or no issue,
cell load,
signaling load,
coverage,
overshooting,
downlink (DL) utilization,
uplink (UL) utilization,
PUCCH interference,
PUSCH interference,
PUSCH-PUCCH interference,
PUCCH performance,
RACH access, and
processor load.

The embodiments described above can be further illustrated by the exemplary method (e.g., procedure) shown in FIG. 12, described below. For example, features of various embodiments discussed above are included in various operations of the exemplary methods shown in FIG. 12.

More specifically, FIG. 12 illustrates an exemplary method (e.g., procedure) of forecasting performance issues associated with cells in a wireless network, according to various exemplary embodiments of the present disclosure. The exemplary method can be performed by a network optimization function associated with the wireless network. For example, the network optimization function can be performed by one or more network nodes in the wireless network, such as described elsewhere herein. Although the exemplary method is illustrated in FIG. 12 by specific blocks in a particular order, the operations corresponding to the blocks can be performed in different orders than shown and can be combined and/or divided into blocks and/or operations having different functionality than shown. Furthermore, the exemplary method shown in FIG. 12 can be complementary to other exemplary methods disclosed herein (e.g., FIGS. 5-6, 11), such that they can be used cooperatively to provide benefits, advantages, and/or solutions to problems described herein. Optional blocks and/or operations are indicated by dashed lines.

The exemplary method can include the operations of block 1210, in which the network optimization function can, for each of a plurality of cells in the wireless network, obtain first time-series data representing a plurality of key performance indicators (KPIs) at a first plurality of past time points. In some embodiments, the plurality of KPIs can include at least two of the KPIs listed in Table 1 above. However, the first time-series data can include other KPIs than the ones listed in Table 1 above.

The exemplary method can also include the operations of block 1220, in which the network optimization function can apply a multi-layer forecasting model to the first time-series data to determine second time-series data representing the plurality of KPIs for each of the plurality of cells at a second plurality of future time points. For example, the multi-layer forecasting model can correspond to the exemplary architecture shown in FIG. 5.

In some embodiments, the operations of block 1220 can include the operations of sub-blocks 1221, 1223, and 1225. In sub-block 1221, the network optimization function can, for each particular KPI, apply a first layer to predict a linear pattern in the first time-series data. In sub-block 1223, the network optimization function can, for each particular KPI, apply a second layer to predict a periodic pattern in the first time-series data. In sub-block 1225, the network optimization function can apply a third layer to predict further patterns in the plurality of based on the first time-series data, the predicted linear patterns, and the predicted periodic patterns. In other words, the first and second layers can operate on individual KPIs while the third layer can operate across multiple KPIs.

In some embodiments, applying the first layer in sub-block 1221 can include, for each particular KPI, applying a double exponential smoothing operation to the first time-series data to determine a level and a trend corresponding to a linear pattern in the first time-series data for the particular KPI. For example, this can correspond to operations of the Holt technique discussed above.

In some embodiments, the operations of block 1220 can also include the operations of sub-block 1222, where the network optimization function can, for each particular KPI, extend a linear pattern determined in the first time-series data to the second plurality of future time points.

In some embodiments, applying the second layer in sub-block 1223 can include the network optimization function performing the following operations for each particular KPI: applying one or more discrete Fourier transforms (DFTs) to the first time-series data to generate first frequency-space data; applying respective threshold operations to the first frequency-space data to generate second frequency-space data; and applying one or more inverse DFTs to the second frequency-space data to generate the predicted periodic pattern in the first time-series data for the particular KPI. For example, the DFT/IDFT can be implemented as FFT/IFFT, or any other suitable computationally efficient DFT method. Moreover, the threshold operations can be implemented by the specific threshold operation discussed above with respect to FIG. 8, or by any other like operation that is suitable for the particular KPIs.

In some embodiments, the operations of block 1220 can also include the operations of sub-block 1224, where the network optimization function can, for each particular KPI, extend a periodic pattern determined in the first time-series data to the second plurality of future time points.

In some embodiments, applying the third layer in sub-block 1225 can include the network optimization function performing the following operations: for each particular KPI, determining a difference between the first time-series data and a sum of the linear pattern predicted by the first layer and the periodic pattern predicted by the second layer; and processing the determined differences with a plurality of stacked causal convolutional layers having exponentially increasing dilation to predict the further pattern for the respective KPIs at the second plurality of future time points. In various embodiments, the further patterns for the respective KPIs can include one or more of the following: non-linear patterns for one or more of the KPIs, and patterns for one or more of the KPIs that involve relationships among multiple KPIs.

In some embodiments, the operations of block 1220 can also include the operations of sub-block 1226, where the network optimization function can, for each particular KPI, combine the predicted further pattern (e.g., from sub-block 1225) with the corresponding extended linear pattern (e.g., from sub-block 1222) and the corresponding extended periodic pattern (e.g., from sub-block 1224) to determine the particular KPI at the second plurality of future time points.

The exemplary method can also include the operations of block 1240, in which the network optimization function can, based on the second time-series data, determine respective probabilities of occurrence for a respective plurality of different performance issues, associated with the plurality of cells, during one or more future time periods that include the second plurality of future time points. For example, the operations of block 1240 can include the operations of the cell issue classifier, discussed above.

In some embodiments, the first plurality of past time points (e.g., in the first time-series) and the second plurality of future time points (e.g., in the second time series) can be spaced at hourly intervals (e.g., equally spaced, every hour). In such embodiments, each probability of occurrence can be determined (e.g., in block 1240) for daily future periods.

In some embodiments, the exemplary method can also include the operations of block 1230, where the network optimization function can select respective confidence interval percentiles for the respective performance issues. In such embodiments, for each particular performance issue, the determined probabilities of occurrence (e.g., from block 1240) can correspond to the confidence interval percentile for the particular performance issue.

In various embodiments, the plurality of performance issues associated with the cells can include at least two of the following:
- normal ("Normal") or no issue ("No_Issue"),
- cell load ("Cell_Load"),
- signaling load ("Signaling_Load"),
- coverage ("Coverage"),
- overshooting ("Overshooting"),
- downlink (DL) utilization ("DL_Utilization"),
- uplink (UL) utilization ("UL_Utilization"),
- PUCCH interference ("PUCCH_Interference"),
- PUSCH interference ("PUSCH_Interference"),
- PUSCH-PUCCH interference ("PUSCH_PUCCH_Interference"),
- PUCCH performance ("PUCCH_Performance"),
- RACH access ("RACH_Access"), and
- processor load ("Processor_Load").

Figure 13:
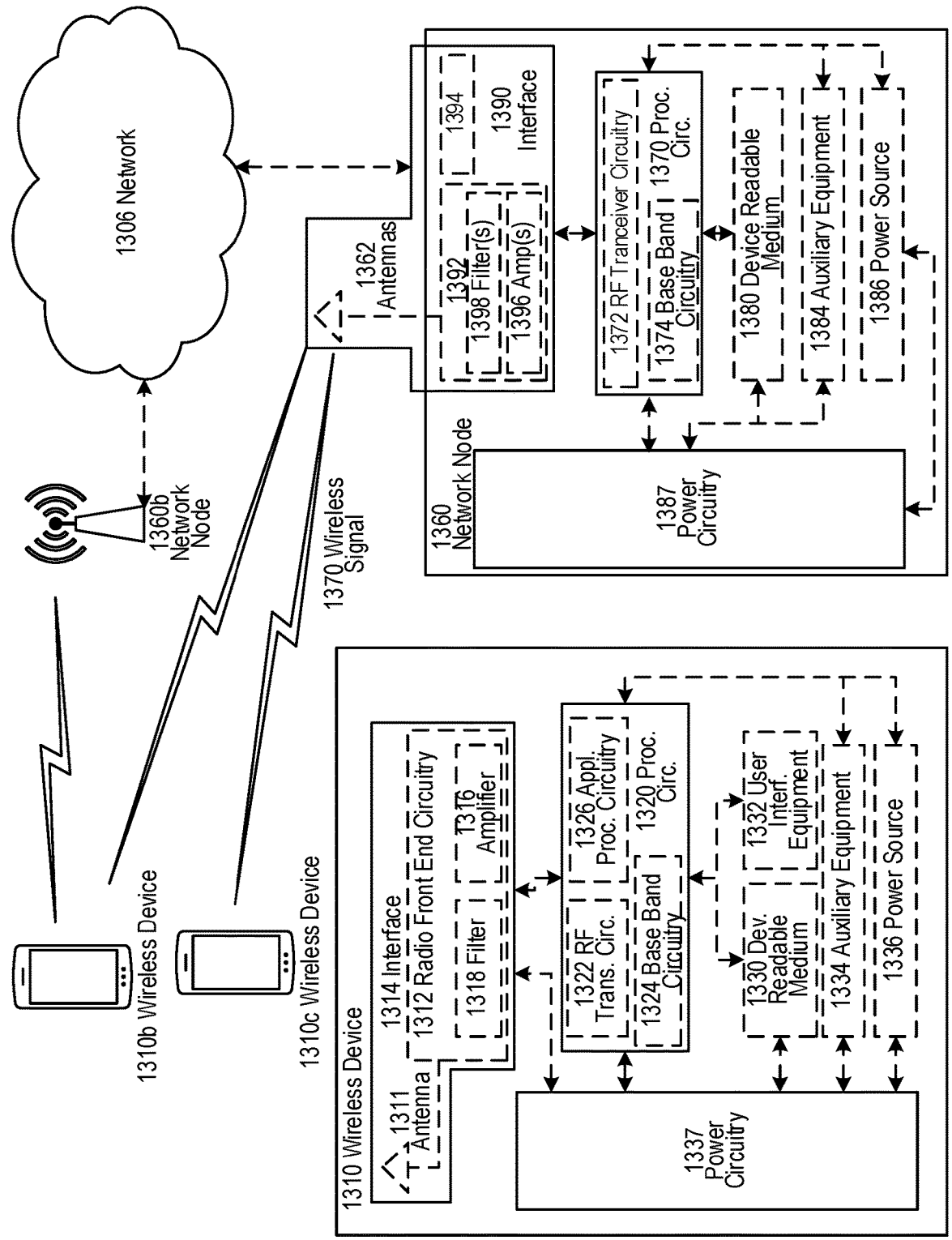
FIG. 13 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 13. For simplicity's sake, the exemplary wireless network shown FIG. 13 only depicts network 1306, network nodes 1360 and 1360b, and WDs 1310, 1310b, and 1310c. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and an RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1360, either alone or in conjunction with other network node 1360 components (e.g., device readable medium 1380). Such functionality can include any of the various wireless features, functions, or benefits discussed herein.

For example, processing circuitry 1370 can execute instructions stored in device readable medium 1380 or in memory within processing circuitry 1370. In some embodiments, processing circuitry 1370 can include a system on a chip (SOC). As a more specific example, instructions (also referred to as a computer program product) stored in medium 1380 can include instructions that, when executed by processing circuitry 1370, can configure network node 1360 to perform operations corresponding to various exemplary methods (e.g., procedures) described herein.

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392.

The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user (e.g., an authorized employee, agent, etc. of a network operator or an equipment manufacturer) to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1310 functionality either alone or in combination with other WD 1310 components, such as device readable medium 1330. Such functionality can include any of the various wireless features or benefits discussed herein.

For example, processing circuitry 1320 can execute instructions stored in device readable medium 1330 or in memory within processing circuitry 1320 to provide the functionality disclosed herein. More specifically, instructions (also referred to as a computer program product) stored in medium 1330 can include instructions that, when executed by processor 1320, can configure wireless device 1310 to perform operations corresponding to various exemplary methods (e.g., procedures) described herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
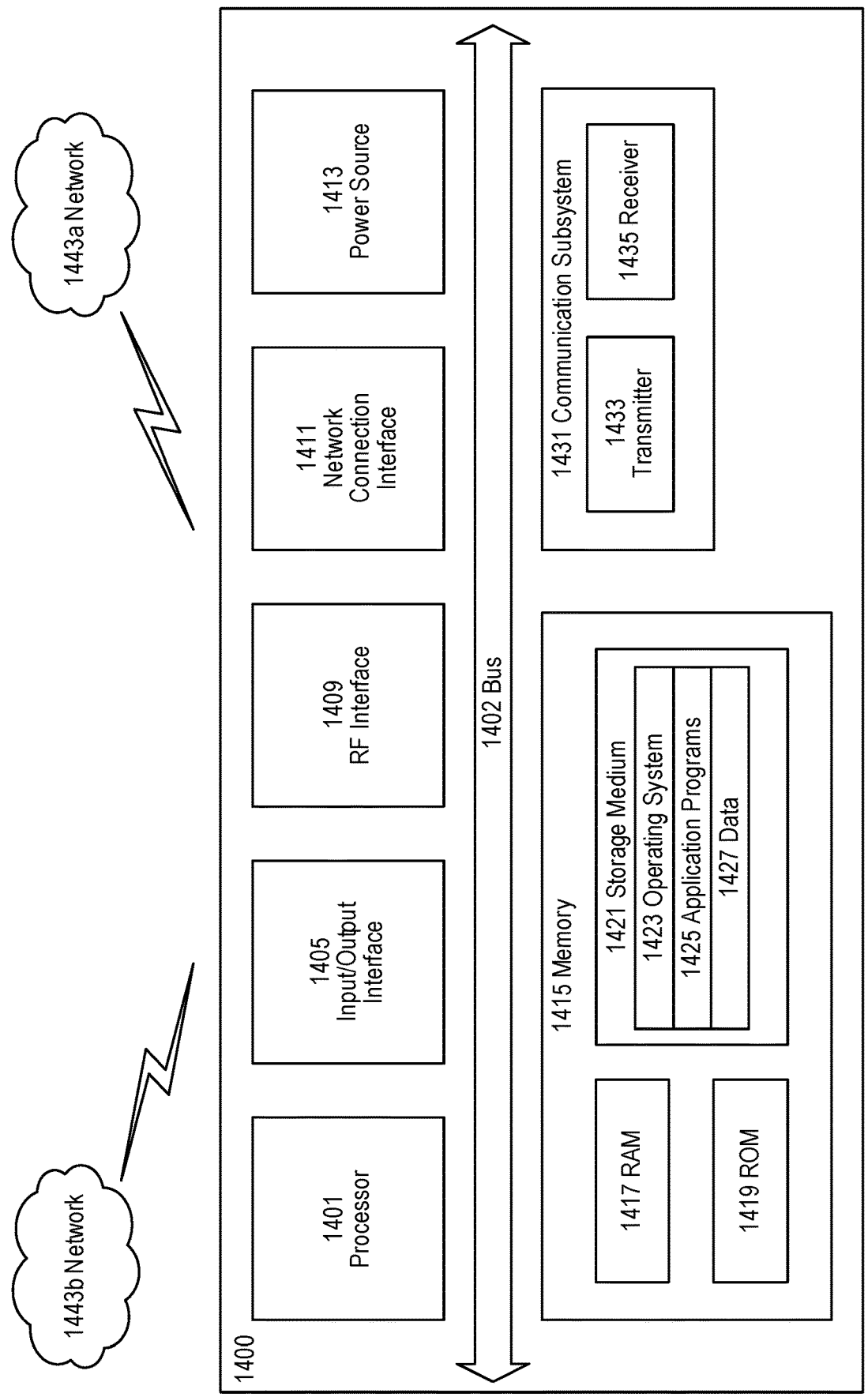
FIG. 14 illustrates an exemplary embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443a. Network 1443a can encompass wired and/or wireless networks such as a local-area network (LAN), a wide-area network (WAN), a computer network, a wireless network, a telecommunications network, another like network or any combination thereof. For example, network 1443a can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1421 can be configured to include operating system 1423; application program 1425 such as a web browser application, a widget or gadget engine or another application; and data file 1427. Storage medium 1421 can store, for use by UE 1400, any of a variety of various operating systems or combinations of operating systems. For example, application program 1425 can include executable program instructions (also referred to as a computer program product) that, when executed by processor 1401, can configure UE 1400 to perform operations corresponding to various exemplary methods (e.g., procedures) described herein.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443b using communication subsystem 1431. Network 1443a and network 1443b can be the same network or networks or different network or networks. Communication subsystem 1431 can be configured to include one or more transceivers used to communicate with network 1443b. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443b can encompass wired and/or wireless networks such as a local-area network (LAN), a wide-area network (WAN), a computer network, a wireless network, a telecommunications network, another like network or any combination thereof. For example, network 1443b can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
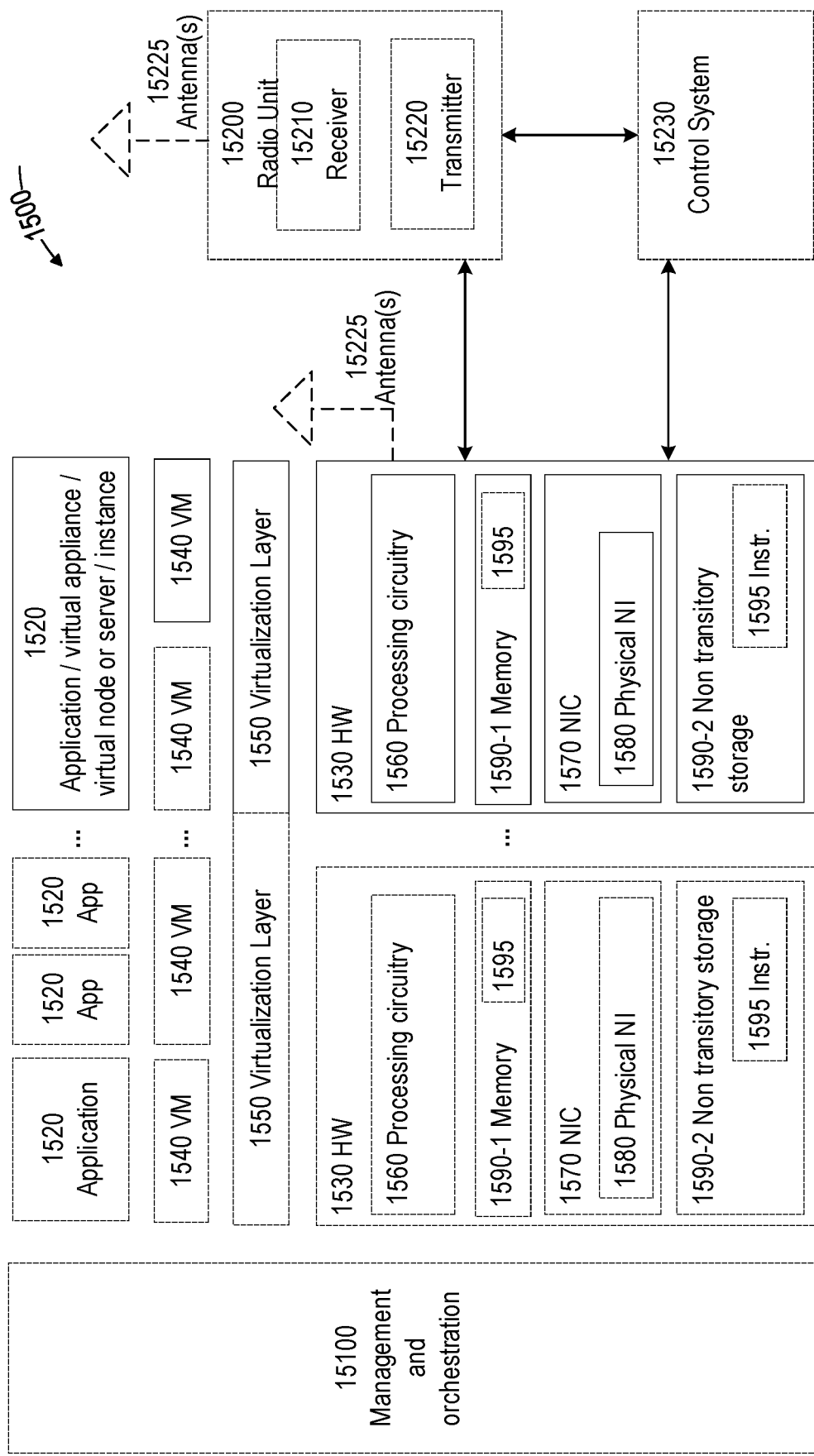
FIG. 15 is a block diagram illustrating an exemplary virtualization environment usable for implementation of various embodiments of network nodes described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500 can include general-purpose or special-purpose network hardware devices (or nodes) 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. For example, instructions 1595 can include program instructions (also referred to as a computer program product) that, when executed by processing circuitry 1560, can configure hardware node 1520 to perform operations corresponding to various exemplary methods (e.g., procedures) described herein. Such operations can also be attributed to virtual node(s) 1520 that is/are hosted by hardware node 1530.

Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment. NFV can also be used in connection with cloud-based infrastructure.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 15230, which can alternatively be used for communication between the hardware nodes 1530 and radio units 15200.

Figure 16:
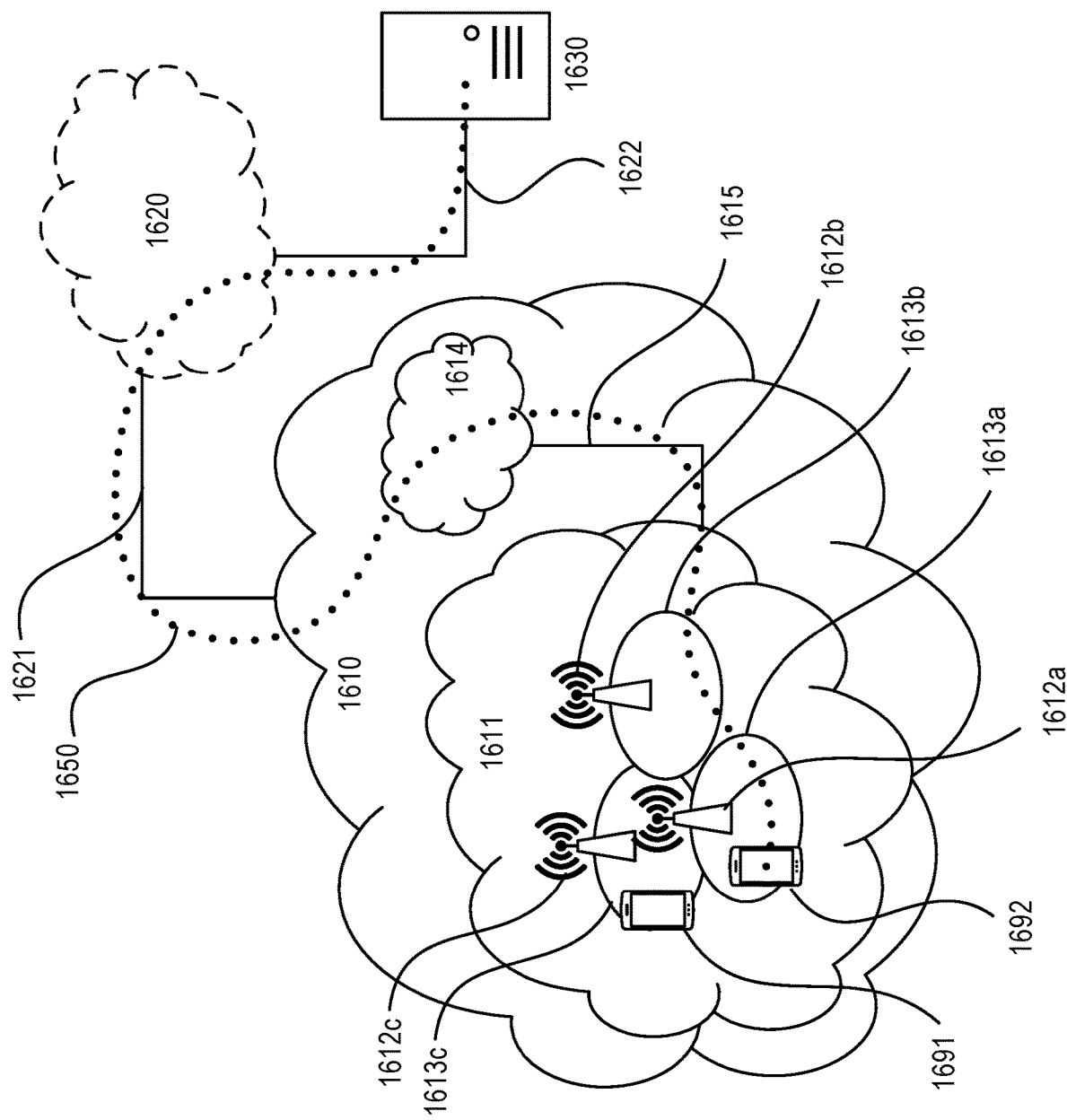
FIGS. 16-17 are block diagrams of various exemplary communication systems and/or networks, in accordance with various aspects described herein.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OT connection 1650, using access network 1611, core network 1614, any intermediate network 1620 and possible further infrastructure (not shown) as intermediaries. OT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions.

Base station 1720 also includes software 1721 stored internally or accessible via an external connection. For example, software 1721 can include program instructions (also referred to as a computer program product) that, when executed by processing circuitry 1728, can configure base station 1720 to perform operations corresponding to various exemplary methods (e.g., procedures) described herein.

Communication system 1700 can also include UE 1730 already referred to, whose hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions.

UE 1730 also includes software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides. Software 1731 can also include program instructions (also referred to as a computer program product) that, when executed by processing circuitry 1738, can configure UE 1730 to perform operations corresponding to various exemplary methods (e.g., procedures) described herein.

Figure 17:
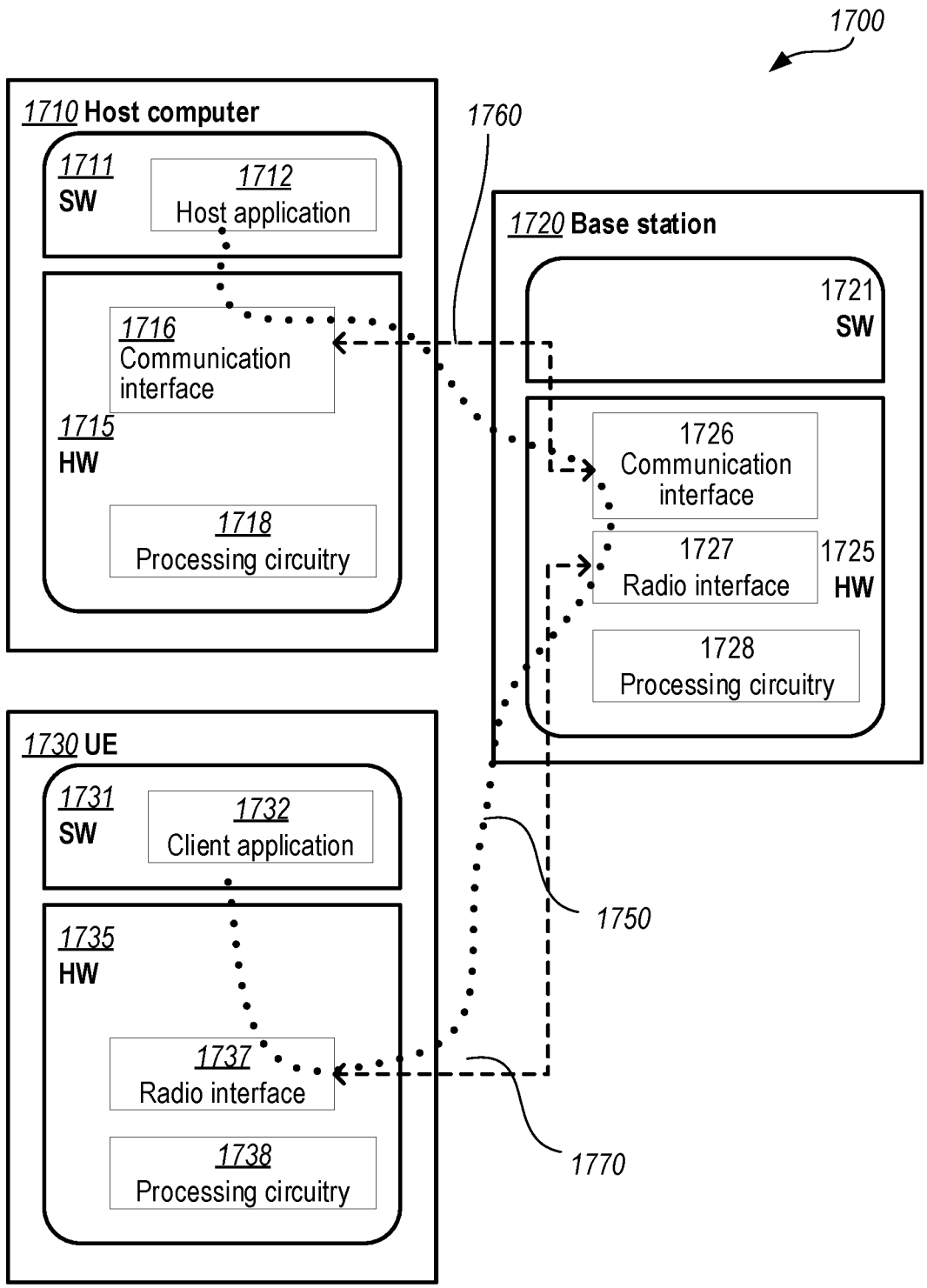

It is noted that host computer 1710, base station 1720 and UE 1730 illustrated in FIG. 17 can be similar or identical to host computer 1230, one of base stations 1712a, 1712b, 1712c and one of UEs 1791, 1792 of FIG. 17, respectively. This is to say, the inner workings of these entities can be as shown in FIG. 17 and independently, the surrounding network topology can be that of FIG. 17.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OT services provided to UE 1730 using OT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OT services.

A measurement procedure can be provided for the purpose of monitoring data rate, latency and other network operational aspects on which the one or more embodiments improve. There can further be an optional network functionality for reconfiguring OT connection 1750 between host computer 1710 and UE 1730, in response to variations in the measurement results. The measurement procedure and/or the network functionality for reconfiguring OT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software.

In addition, a device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. As such, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The invention claimed is:

1. A computer-implemented method of forecasting performance issues associated with cells in a wireless network, the method performed by a network optimization function associated with the wireless network and comprising:
   for each of a plurality of cells in the wireless network, obtaining first time-series data representing a plurality of key performance indicators (KPIs) at a first plurality of past time points;
   applying a multi-layer forecasting model to the first time-series data to determine second time-series data representing the plurality of KPIs for each of the plurality of cells at a second plurality of future time points, wherein applying the multi-layer forecasting model to the first time-series data comprises:
      for each particular KPI, applying a first layer to predict a linear pattern in the first time-series data;
      for each particular KPI, applying a second layer to predict a periodic pattern in the first time-series data; and
      applying a third layer to predict further patterns in the plurality of KPIs based on the first time-series data, the predicted linear patterns, and the predicted periodic patterns; and
   based on the second time-series data, determining respective probabilities of occurrence for a respective plurality of different performance issues, associated with the plurality of cells, during one or more future time periods that include the second plurality of future time points.

2. The method of claim 1, wherein applying the first layer comprises, for each particular KPI, applying a double exponential smoothing operation to the first time-series data to determine a level and a trend corresponding to a linear pattern in the first time-series data for the particular KPI.

3. The method of claim 1, wherein applying the second layer comprises, for each particular KPI:
   applying one or more discrete Fourier transforms (DFTs) to the first time-series data to generate first frequency-space data;
   applying respective threshold operations to the first frequency-space data to generate second frequency-space data; and
   applying one or more inverse DFTs to the second frequency-space data to generate the predicted periodic pattern in the first time-series data for the particular KPI.

4. The method of claim 1, wherein applying the third layer comprises:
   for each particular KPI, determining a difference between the first time-series data and a sum of the linear pattern predicted by the first layer and the periodic pattern predicted by the second layer; and
   processing the determined differences with a plurality of stacked causal convolutional layers having exponentially increasing dilation to predict the further patterns for the respective KPIs at the second plurality of future time points.

5. The method of claim 4, wherein the further patterns for the respective KPIs includes one of the following:
   non-linear pattern for one or more KPIs; and
   patterns for one or more KPIs that are based on relationships among multiple KPIs.

6. The method of claim 4, wherein:
   applying the first layer further comprises, for each particular KPI, extending a linear pattern determined in the first time-series data to the second plurality of future time points; and
   applying the second layer further comprises, for each particular KPI, extending a periodic pattern determined in the first time-series data to the second plurality of future time points.

7. The method of claim 6, wherein applying the multi-layer forecasting model further comprises, for each particular KPI, combining the predicted further pattern with the corresponding extended linear pattern and the corresponding extended periodic pattern to determine the particular KPI at the second plurality of future time points.

8. The method of claim 1, wherein:
   the first plurality of past time points and the second plurality of future time points are spaced at hourly intervals; and
   each probability of occurrence is determined for daily future time periods.

9. The method of claim 1, wherein:
the method further comprises selecting respective confidence interval percentiles for the respective performance issues; and
for each particular performance issue, the determined probabilities of occurrence correspond to the confidence interval percentile for the particular performance issue.

10. The method of claim 1, wherein the plurality of performance issues associated with the cells include at least two of the following:
normal or no issue;
cell load;
signaling load;
coverage;
overshooting;
downlink (DL) utilization;
uplink (UL) utilization;
physical UL control channel (PUCCH) interference;
physical UL shared channel (PUSCH) interference;
PUSCH-PUCCH interference;
PUCCH performance;
random access channel (RACH) access; and
processor load.

11. The method of claim 1, wherein the plurality of KPIs for the cells include at least two of the following:
average number of active downlink (DL) users per transmission time interval (TTI);
average number of active UL users per TTI;
average number of DL scheduling entities per TTI;
average number of UL scheduling entities per TTI;
radio resource control (RRC) connection attempts;
average number of RRC_CONNECTED users;
maximum number of RRC_CONNECTED users;
data volume for DL data radio bearer (DRB) traffic;
data volume for UL DRB traffic;
data volume for DL signaling radio bearer (SRB) traffic;
data volume for UL SRB traffic;
average DL physical resource block (PRB) utilization;
average UL PRB utilization;
average physical DL control channel (PDCCH) control channel element (CCE) load;
average channel quality indicator (CQI) reported;
portion of reported CQI below threshold;
average user DL throughput;
average user UL throughput;
user equipment (UE) random access attempts on random access channel (RACH);
UE random access attempt success ratio;
average DL hybrid ARQ (HARQ) discontinuous transmission (DTX) ratio;
average UL HARQ DTX ratio;
portion of physical UL shared channel (PUSCH) SINR<−2 dB;
portion of physical UL control channel (PUCCH) SINR<0 dB;
average PUSCH SINR;
average PUCCH SINR;
average PUSCH interference level;
average PUCCH interference level;
average UL pathloss;
portion of UL pathloss above 130 dB;
portion of UE UL transmit power limited;
average processor load; and
portion of processor load>80% of capacity.

12. A network optimization function configured to forecast performance issues associated with cells in a wireless network, the network optimization function being implemented by processing circuitry and communication interface circuitry arranged as:
a data collection function configured to obtain, for each of a plurality of cells in the wireless network, first time-series data representing a plurality of key performance indicators (KPIs) at a first plurality of past time points;
a forecasting function configured to apply a multi-layer model to the first time-series data to determine second time-series data representing the plurality of KPIs for each of the plurality of cells at a second plurality of future time points, wherein the forecasting function is configured to apply the multi-layer forecasting model to the first time-series data based on:
for each particular KPI, applying a first layer to predict a linear pattern in the first time-series data;
for each particular KPI, applying a second layer to predict a periodic pattern in the first time-series data; and
applying a third layer to predict further patterns in the plurality of KPIs based on the first time-series data, the predicted linear patterns, and the predicted periodic patterns; and
a cell issue classifier function configured to determine, based on the second time-series data, respective probabilities of occurrence for a respective plurality of different performance issues, associated with the plurality of cells, during one or more future time periods that include the second plurality of future time points.

13. The network optimization function of claim 12, wherein the forecasting function is configured to apply the first layer based on, for each particular KPI, applying a double exponential smoothing operation to the first time-series data to determine a level and a trend corresponding to a linear pattern in the first time-series data for the particular KPI.

14. The network optimization function of claim 12, wherein the forecasting function is configured to apply the second layer based on, for each particular KPI:
applying one or more discrete Fourier transforms (DFTs) to the first time-series data to generate first frequency-space data;
applying respective threshold operations to the first frequency-space data to generate second frequency-space data; and
applying one or more inverse DFTs to the second frequency-space data to generate the predicted periodic pattern in the first time-series data for the particular KPI.

15. The network optimization function of claim 12, wherein the forecasting function is configured to apply the third layer based on:
for each particular KPI, determining a difference between the first time-series data and a sum of the linear pattern predicted by the first layer and the periodic pattern predicted by the second layer; and
processing the determined differences with a plurality of stacked causal convolutional layers having exponentially increasing dilation to predict the further patterns for the respective KPIs at the second plurality of future time points.

16. The network optimization function of claim 15, wherein:
the forecasting function is configured to apply the first layer further based on, for each particular KPI, extending a linear pattern determined in the first time-series data to the second plurality of future time points; and the forecasting function is configured to apply the first layer further based on, for each particular KPI, extending a periodic pattern determined in the first time-series data to the second plurality of future time points.

17. The network optimization function of claim 12, wherein:

the processing circuitry and the communication interface circuitry are part of one or more processing nodes in the wireless network or in a cloud-computing infrastructure coupled to the wireless network; and the network optimization function is implemented as a virtualized network function hosted by the one or more processing nodes.

18. A non-transitory, computer-readable medium storing computer-executable instructions that, when executed by processing circuitry associated with a network optimization function in a wireless network, configure the network optimization function to perform operations corresponding to the method of claim 1.

19. The network optimization function of claim 16, wherein the forecasting function is configured to apply the first layer further based on, for each particular KPI, combining the predicted further pattern with the corresponding extended linear pattern and the corresponding extended periodic pattern to determine the particular KPI at the second plurality of future time points.

20. The network optimization function of claim 12, wherein:

the first plurality of past time points and the second plurality of future time points are spaced at hourly intervals; and each probability of occurrence is determined by the cell issue classifier function for daily future time periods.

* * * * *

UNITED STATES PATENT AND TRADEMARK OFFICE
CERTIFICATE OF CORRECTION

PATENT NO. : 12,218,803 B2  
APPLICATION NO. : 17/795975  
DATED : February 4, 2025  
INVENTOR(S) : Horemuz et al.

It is certified that error appears in the above-identified patent and that said Letters Patent is hereby corrected as shown below:

In the Specification

In Column 1, Line 55, delete "below" and insert -- below. --, therefor.

In Column 2, Line 11, delete "of based" and insert -- of KPIs based --, therefor.

In Column 2, Line 47, delete "layer," and insert -- layer; --, therefor.

In Column 4, Line 14, delete "disclosure" and insert -- disclosure. --, therefor.

In Column 6, Line 22, delete "releases," and insert -- releases. --, therefor.

In Column 6, Line 67, delete "Xl" and insert -- X2 --, therefor.

In Column 10, Line 44, delete "respect" and insert -- respect to --, therefor.

In Column 10, Line 65, delete "such" and insert -- such as --, therefor.

In Column 12, Line 56, delete "form" and insert -- to form --, therefor.

In Column 14, Line 45, delete "#cellsxtimex#KPIs," and insert -- #cells x time x #KPIs, --, therefor.

In Columns 15 & 16, in Table 1-continued, under "KPI Name", Line 20, delete "'PUSCH_SINR_BELOW _NEG2 DB_RATE'" and insert -- 'PUSCH_SINR_BELOW _NEG2DB_RATE' --, therefor.

In Columns 15 & 16, in Table 1-continued, under "KPI Name", Line 21, delete "'PUCCH_SINR_BELOW _NEG0 DB_RATE'" and insert -- 'PUCCH_SINR_BELOW _NEG0DB_RATE' --, therefor.

Signed and Sealed this  
Nineteenth Day of August, 2025

Coke Morgan Stewart  
*Acting Director of the United States Patent and Trademark Office*

CERTIFICATE OF CORRECTION (continued)
U.S. Pat. No. 12,218,803 B2

In Columns 15 & 16, in Table 1-continued, under "KPI Name", Line 24, delete "'UL_PATHLOSS_ABOVE 130 DB_RATE'" and insert -- 'UL_PATHLOSS_ABOVE 130DB_RATE' --, therefor.

In Column 15, Line 54, delete "used" and insert -- used to --, therefor.

In Column 18, Line 16, delete "shown" and insert -- shown in --, therefor.

In Column 19, Line 66, delete "of based" and insert -- of KPIs based --, therefor.

In Column 21, Line 25, delete "("Overshooting")," and insert -- ("Overshooting"), --, therefor.

In Column 21, Lines 30-31, delete "("PUSCH_PUCCH_Interference")," and insert -- ("PUSCH_PUCCH_Interference"), --, therefor.

In Column 24, Line 6, delete "units" and insert -- units. --, therefor.

In Column 25, Line 20, delete "1390" and insert -- 1392 --, therefor.

In Column 26, Line 49, delete "etc.) personal" and insert -- etc.), personal --, therefor.

In Column 27, Line 18, delete "1314" and insert -- 1312 --, therefor.

In Column 30, Line 2, delete "14200" and insert -- 1400 --, therefor.

In Column 30, Line 11, delete "interchangeable." and insert -- interchangeably. --, therefor.

In Column 30, Line 20, delete "1433," and insert -- 1413, --, therefor.

In Column 35, Line 30, delete "OT" and insert -- OTT --, therefor.

In Column 35, Line 33, delete "OT" and insert -- OTT --, therefor.

In Column 37, Line 17, delete "OT" and insert -- OTT --, therefor.

In Column 37, Line 17, delete "OT" and insert -- OTT --, therefor.

In Column 37, Line 24, delete "OT" and insert -- OTT --, therefor.

In Column 37, Line 31, delete "OT" and insert -- OTT --, therefor.

In Column 37, Line 36, delete "OT" and insert -- OTT --, therefor.

In Column 37, Line 39, delete "OT" and insert -- OTT --, therefor.

In Column 37, Line 50, delete "OT" and insert -- OTT --, therefor.

CERTIFICATE OF CORRECTION (continued)
U.S. Pat. No. 12,218,803 B2

In Column 37, Line 60, delete "OT" and insert -- OTT --, therefor.

In Column 39, Line 24, delete "according" and insert -- according to --, therefor.